US010460252B2

(12) United States Patent
Hershey et al.

(10) Patent No.: US 10,460,252 B2
(45) Date of Patent: Oct. 29, 2019

(54) SYSTEM AND METHOD OF CHAINING ALGORITHMS FOR GLOBAL OBJECT RECOGNITION TO IMPROVE PROBABILITY OF CORRECTNESS AND REDUCE PROCESSING LOAD

(71) Applicant: Raytheon Company, Waltham, MA (US)

(72) Inventors: Paul C. Hershey, Ashburn, VA (US); Richard Radcliffe, Chantilly, VA (US); Brianne R. Hoppes, Westminster, CO (US)

(73) Assignee: Raytheon Company, Waltham, MA (US)

( * ) Notice: Subject to any disclaimer, the term of this patent is extended or adjusted under 35 U.S.C. 154(b) by 428 days.

(21) Appl. No.: 15/053,959

(22) Filed: Feb. 25, 2016

(65) Prior Publication Data

US 2017/0200090 A1    Jul. 13, 2017

Related U.S. Application Data

(63) Continuation-in-part of application No. 14/809,352, filed on Jul. 27, 2015, now abandoned.
(Continued)

(51) Int. Cl.
*G06F 17/30*    (2006.01)
*G06N 7/00*    (2006.01)
(Continued)

(52) U.S. Cl.
CPC ............ *G06N 7/005* (2013.01); *G06F 16/29* (2019.01); *G06F 16/5854* (2019.01); *G06N 20/00* (2019.01)

(58) Field of Classification Search
CPC ......... G06F 17/30241; G06F 17/30259; G06F 16/5854; G06N 7/005
See application file for complete search history.

(56) References Cited

U.S. PATENT DOCUMENTS 5,392,365 A    2/1995 Steinkirchner
5,491,510 A    2/1996 Gove
(Continued)

OTHER PUBLICATIONS

Edward Dou,"Automatic Target Recognition: Bringing Academic Progression into the Aerospace Industry," MEOSTN Symposium, Tucson Arizona, Jun. 8-11, 2015 Raytheon.
(Continued)

*Primary Examiner* — Jean M Corrielus
(74) *Attorney, Agent, or Firm* — Eric A. Gifford

(57) ABSTRACT

A system and method improves the probability of correctly detecting an object from a collection of source data and reduces the processing load. A plurality of algorithms for a given data type are selected and ordered based on a cumulative trained probability of correctness (Pc) that each of the algorithms, which are processed in a chain and conditioned upon the result of the preceding algorithms, produce a correct result and a processing. The algorithms cull the source data to pass forward a reduced subset of source data in which the conditional probability of detecting the object is higher than the a priori probability of the algorithm detecting that same object. The Pc and its confidence interval is suitably computed and displayed for each algorithm and the chain and the final object detection.

30 Claims, 14 Drawing Sheets

Related U.S. Application Data

(60) Provisional application No. 62/028,927, filed on Jul. 25, 2014.

(51) Int. Cl.
  G06N 20/00 (2019.01)
  G06F 16/29 (2019.01)
  G06F 16/583 (2019.01)

(56) References Cited

U.S. PATENT DOCUMENTS

| | | | | |
|---|---|---|---|---|
| 6,154,185 | A | * | 11/2000 | Watanabe ............... H01Q 15/14 343/897 |
| 6,578,017 | B1 | | 6/2003 | Ebersole et al. |
| 8,755,837 | B2 | * | 6/2014 | Rhoads ............. G06F 17/30244 455/556.1 |
| 8,768,313 | B2 | * | 7/2014 | Rodriguez ......... G06K 9/00986 382/118 |
| 9,271,133 | B2 | * | 2/2016 | Rodriguez ......... G06K 9/00986 |
| 2002/0102966 | A1 | | 8/2002 | Lev et al. |
| 2009/0063431 | A1 | * | 3/2009 | Erol .................... G06K 9/00463 |
| 2010/0048242 | A1 | * | 2/2010 | Rhoads ............. G06F 17/30244 455/556.1 |
| 2011/0143811 | A1 | * | 6/2011 | Rodriguez ......... G06K 9/00986 455/556.1 |
| 2015/0011194 | A1 | * | 1/2015 | Rodriguez ......... G06K 9/00986 455/414.1 |
| 2016/0070674 | A1 | | 3/2016 | Hershey et al. |
| 2016/0306922 | A1 | * | 10/2016 | van Rooyen ........... H04L 67/10 |

OTHER PUBLICATIONS

Ghodsnia, "An IN-GPU-Memory Column-Oriented Database for Processing Analytical Workloads," presented at The VLDB 12 PhD Workshop, Aug. 27-31, 2012, Istanbul, Turkey, pp. 54-59.

Mohammadi et al., "Subjective and Objective Quality Assessment of Image: A Survey," Majlesi Journal of Electrical Engineering, vol. 9, No. 1, Mar. 2015, pp. 55-83.

Baik et al., "Application of Adaptive Object Recognition Approach to Aerial Surveillance," Proceedings of the Fifth International Conference on Information Fusion, Jul. 8-11, 2002, IEEE Publisher, pp. 658-663.

Samra et al., "Localization of License Plate Number Using Dynamic Image Processing Techniques and Genetic Algorithms," IEEE Transactions on Evolutionary Computation, vol. 18, No. 2, Apr. 2014, pp. 244-257.

Hershey et al., "Composable, Distributed System to Derive Actionable Mission Information from Intelligence, Surveillance and Reconnaissance (ISR) Data," 2013 IEEE.

Pham et al., "Intelligence, Surveillance, and Reconnaissance Fusion for Coalition Operations," 11th International Conference on Information Fusion, Jun. 30 ? Jul. 3, 2008, Cologne, Germany.

Rodrigues, "About the ZPG-2N Anti-Submarine Blimp," accessed Apr. 1, 2015, http://battleblimps.com/war-games.html.

Suja et al., "Fusion Based Object Detection," 2010 National Conference on Communications (NCC) Jan. 29-31, 2010, pp. 1-3, IEEE.

Diaconis et al, "Some Alternatives to Bayes' Rule," Technical Report No. 205, Oct. 1983, Department of Statistics, Stanford University.

Blaschke et al., "Geographic Object-Based Image Analysis—Towards a new paradigm," J Photogramm Remote Sens. Jan. 2014; 87(100), pp. 180-191.

Ofili et al., "An In-Depth Analysis and Image Quality Assessment of an Exponent-Based Tone Mapping Algorithm," International Journal "Information Models and Analyses" Vo. 1, 2012, pp. 236-250.

Brummit et al., "Malaysia defends Search for Missing Jet," Accessed Mar. 20, 2014, http://news.msn.com/world/malaysia-defends-search-for-missing-jet.

Innis et al., "Newly Detected Objects Draw Searchers for Malaysian Plane," Accessed Apr. 11, 2014, http://www.nytimes.com/2014/03/20/world/asia/missing-malaysia-flight . . . .

Lowe, "Object Recognition from Local Scale-Invariant Features," Proc. of the International Conference on Computer Vision, Corfu, Sep. 1999, pp. 1-8.

Chen et al., "Scrubbing Query Results from Probabilistic Databases," IDEAS11 2011, Sep. 21-23, Lisbon Portugal, pp. 79-87.

Viola et al., "Rapid Object Detection Using a Boosted Cascade of Simple Features," IEEE, 2001.

Airborne Support Data Extensions (ASDE), Version 1.1, Nov. 16, 2000.

Levachkine et al., "Simultaneous Segmentation-Recognition-Vectorization of Meaningful Geographical Object in Geo-Images," CIARP 2003, LNCS 2905, pp. 635-642.

Brigham Young University, "Smart Object Recognition Algorithm Doesn't Need Humans," Accessed Apr. 11, 2014, http://www.sciencedaily.com/releases/2014/01/140116091147.htm.

Chapa et al., "A Stochastic Model for Estimating Ballistic Missile Negation via Left of Launch Techniques," Copyright 2000-2014, Raytheon Company, pp. 1-16.

Doulkeridis et al., "A survey of large-scale analytical query processing in MapReduce," The VLDB Journal, 2014, 23, pp. 355-380.

Hershey et al., "System for Local/Regional/Global Joined Object Recognition," IEEE, 2015, pp. 747-753.

* cited by examiner

DYNAMIC FEEDBACK PATH(S)

OUTPUT

| LEVEL ID | SUBLEVEL ID | STD DEV | AVERAGE | PROBABILITY | UPPER BOUND | LOWER BOUND | CI UPPER | CI LOWER |
|---|---|---|---|---|---|---|---|---|
| 1 | 1 | 1.312758 | 897.84 | 0.9976 | 0.99908562 | 0.99614138 | 0.001459 | 0.001459 |
| 2 | 1 | 2.346629 | 793.56 | 0.99195 | 0.994883286 | 0.989016714 | 0.002933 | 0.002933 |
| 2 | 2 | 0.663325 | 99.76 | 0.9976 | 1.00423325 | 0.99096675 | 0.0024 | 0.006633 |
| 3 | 1 | 6.5 | 358.2 | 0.8955 | 0.91175 | 0.87925 | 0.01625 | 0.01625 |
| 3 | 2 | 5.560276 | 358 | 0.895 | 0.908900689 | 0.881099311 | 0.013901 | 0.013901 |
| 3 | 3 | 0 | 0 | 0 | 0 | 0 | 0 | 0 |
| 3 | 4 | 0 | 0 | 0 | 0 | 0 | 0 | 0 |
| 4 | 1 | 7.112196 | 241.8 | 0.806 | 0.82970732 | 0.78229268 | 0.023707 | 0.023707 |
| 4 | 2 | 3.315117 | 89.64 | 0.8964 | 0.929551169 | 0.863248831 | 0.033151 | 0.033151 |
| 4 | 3 | 5.85178 | 243.08 | 0.81026667 | 0.829772601 | 0.790760732 | 0.019506 | 0.019506 |
| 4 | 4 | 3.328163 | 89.08 | 0.8908 | 0.924081627 | 0.857518373 | 0.033282 | 0.033282 |
| 5 | 1 | 6.487938 | 121.52 | 0.6076 | 0.640039688 | 0.575160312 | 0.03244 | 0.03244 |
| 5 | 2 | 3.937004 | 80 | 0.8 | 0.839370039 | 0.760629961 | 0.03937 | 0.03937 |
| 5 | 3 | 6.116916 | 121.8 | 0.609 | 0.639584582 | 0.578415418 | 0.030585 | 0.030585 |

CONTINUED FROM FIG.7A

FIG.7b

SYSTEM AND METHOD OF CHAINING ALGORITHMS FOR GLOBAL OBJECT RECOGNITION TO IMPROVE PROBABILITY OF CORRECTNESS AND REDUCE PROCESSING LOAD

RELATED APPLICATIONS

This application claims the priority benefit as a continuation-in-part under 35 U.S.C. 120 to U.S. Utility application Ser. No. 14/809,352 "SYSTEM AND METHOD FOR GLOBAL OBJECT RECOGNITION" filed on Jul. 27, 2015, which claimed benefit of priority under 35 U.S.C. 119(e) to U.S. Provisional Application No. 62/028,927, entitled "MIDATA APPLICATION TO LOCAL/REGIONAL/GLOBAL JOINED OBJECT RECOGNITION (MAJOR)," filed Jul. 25, 2014, which is hereby incorporated herein by reference in its entirety.

TECHNICAL FIELD

The present application relates generally to the technical field of object recognition, and, in various embodiments, to systems and methods of formulating an algorithmic processing path and, in particular, a chained algorithmic processing path for processing source data such as geographic images and/or full-motion video imagery, audio, text, signals and human intelligence to detect an object (e.g. a physical object or attributes thereof, a state of the source data, a word cloud, an intelligence source, a threat, a particular signal, etc.) having a particular set of characteristics with improved Probability of Correctness (Pc), a confidence level of that assessment and reduced processing load.

BACKGROUND

Past events demonstrate a desire for technologies that provide timely identification and geo-location of objects lost within a vast geographic area covering thousands of square kilometers over both land and water.

As one example, on May 8, 2014, a Malaysian Boeing 777-200ER airliner, traveling from Kuala Lumpur to Beijing China, disappeared in flight. A massive search was conducted by multiple countries using advanced satellite, radar, and ISR (Intelligence, Surveillance and Reconnaissance) technologies. However, the airliner was not located within the first two weeks of its disappearance. During this two week period, over 3 million people, both military and civilians, reviewed over 257 million images covering 24,000 sq. kms., including land and water-based images. Even with this manpower and technology, the missing airliner could not be located.

Conventionally, analysts use advanced satellite, radar, and ISR capabilities to collect mission data, but then spend significant time and resources processing these data to extract relevant information. Corporations, such as IBM and Google, that are involved in the processing of large data sets (conventionally known as "Big Data") are working on the problem for non-image content.

Another approach for analyzing millions of images is to use crowd sourcing via the Internet. However, this approach has drawbacks as well, such as accessibility to up-to-dated satellite imagery, lack of training, and the potential for false reporting and Denial of Service (DoS) cyberattacks.

Yet a further approach to locating objects in diverse geographical areas is to use traditional ISR techniques. These techniques include using Unmanned Air Systems (UASs) for air, surface, subsurface scanning and image acquisition. However, these techniques also have their drawbacks in that they are typically associated with high costs, a short search time, difficulties in relevancy (e.g., the unmanned aerial system must be in the right area at right time), and they require large communication bandwidths to send imagery data to a ground station for processing.

One form of object detection in which targets are recognized is called Automatic Target Recognition (ATR) of which "Discrimination" is a sub-class. Edward Dou, of Raytheon presented a paper entitled "Automatic Target Recognition: Bringing Academic Progression into the Aerospace Industry," Raytheon MEOSTN Symposium, Tucson Ariz., Jun. 8-11, 2015 in which he conducted a literature reviewed 165 academic papers, spanning journals and conferences, and concluded that there was little or no published academic research with respect to providing confidence gages (i.e. confidence intervals) with respect to the quality and accuracy of ATR and discrimination algorithm results.

For industry and the Department of Defense, traditional approaches for object detection use advanced satellite, radar, and ISR capabilities to collect and then fuse mission data (S. Levachkine, et al., "Simultaneous Segmentation-Recognition-Vectorization of Meaningful Geographical Objects in Geo-Images," Progress in Pattern Recognition, Speech and Image Analysis, Lecture Notes in Computer Science Vol. 2905, 2003, pp 635-642.). There are several drawbacks to this approach. For example, the ISR collection platform can add significant additional cost, may have limited search time, must be in the right area at right time, and requires additional time to complete the ISR data collection and analysis process. Other limitations to this approach include: correlation of collected data is weak, results are not statistically computed, and (as additional ISR assets and staff are applied to identify objects) redundant tasking and inefficient mission planning are likely to occur (T. Pham, et al., "Intelligence, Surveillance, and Reconnaissance Fusion for Coalition Operations," 11th Intl. Conf. Inform. Fusion, June 2008). Traditional tools that funnel data into the location and recognition information do not overcome these limitations and meet mission critical requirements (T. Pham, et al., "Intelligence, Surveillance, and Reconnaissance Fusion for Coalition Operations," 11th Intl. Conf. Inform. Fusion, June 2008 and P. Hershey and M Wang, "Composable, Distributed System to Derive Actionable Mission Information from Intelligence, Surveillance, and Reconnaissance (ISR) Data," Proc. of the 2013 IEEE Systems Conference, Orlando, Fla., Apr. 17, 2013).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

In an embodiment, a computer-implemented method or system selects a subset of algorithms based, at least in part, on a cumulative trained probability of correctness (Pc) that each of the algorithms, which are processed in a chain on source data of a particular data type (images, audio, text, human intelligence, signals, etc.) and conditioned upon the result of the preceding algorithms, produce a correct result. The algorithms cull (selectively reduce) the source data to pass forward a reduced subset of source data in which the conditional probability of detecting the object is higher than the a priori probability of the algorithm detecting that same object. The computer-implemented method orders the algorithms based on algorithm metadata (e.g. mission relevance, processing resources and image culling percentage) to reduce an expected processing load. At least one result of the algorithmic processing indicates whether the object is detected in one or more of the source data output from the last algorithm in the chain. A cumulative object Pc and an associated confidence level are computed for the object. In certain embodiments, a cumulative algorithm Pc and confidence level is reported for each algorithm or level in the chain.

In an embodiment, the steps of selecting and ordering the subset of algorithms are separated into "training" and "operational" phases, which may, for example, both be implemented on a client-server architecture or the training may be implemented on a client-server architecture while the operational phase is implemented on a client device such as a smart phone, tablet or laptop computer. For each of a plurality of objects, a non-real-time evaluation selects a subset from a plurality of candidate subsets of different chained algorithms based on its trained Pc and possibly an expected processing load for each object. During operations, a real-time selection of one of the defined subsets is made based on object metadata and other inputs, such as the scope of the search. If the current search does not match one of the defined subsets, an ordered subset of chained algorithms is selected in real-time from a previously derived chain of processing algorithms relevant to the context of the newly defined search criteria and based on the object and algorithm metadata.

In an embodiment, to enhance the efficiency with which candidate subsets are selected, a candidate subset's cumulative trained Pc is evaluated against a threshold at each level in the chain and disqualified if the trained Pc does not exceed the threshold. The threshold is suitably lowered at each successive level in the chain. A plurality of candidate subsets can be evaluated in a multi-path tree by evaluating each path at each level against the threshold to disqualify paths and identify one or more candidate subsets whose cumulative trained Pc exceeds a final threshold. Confidence levels for each path may be computed at each level and used to disqualify paths.

In an embodiment, a stochastic math model is used to define the cumulative trained Pc based on Bayes or Non-Bayesian techniques such as Jeffrey's rule or Dempster's rule. A discrete even simulator (DES) provides a computer model to implement the cumulative Pc equation and run a Monte Carlo simulation based on source data containing different instances of the object. The simulation generates the corresponding trained PC and confidence intervals at each level of the chain. The same approach may be used to compute the algorithm and object Pc and confidence levels during operations.

In an embodiment, in a chain of N algorithms the first N−1 algorithms "pre-filter" the retrieved source data for the $N^{th}$ object detection algorithm. Pre-filtering both reduces the expected processing load and improves the conditional probability that the $N^{th}$ object detection algorithm will correctly detect the object. The results of the first N−1 pre-filtering algorithms are filtering results e.g., file big or small, image cloud or clear etc. The results of the $N^{th}$ objection detection algorithm indicate whether the object is detected in one or more of the source data that makes it through the chain. In another embodiment, the chain of N algorithms includes no single algorithm that is configured to detect the object. The results of each algorithm provide some evidence as to object detection. A decision engine processes the results from at least a plurality of the algorithms and based on the cumulative evidence makes object detection decisions. This approach also reduces expected processing load and improves Pc during training and operations.

In different embodiments, multiple independent chained subsets, each based on processing a different data type, may be configured to support the same object detection. The chained subsets may be executed in parallel on their respective source data and their results fused to enhance object detection. An overall Pc and confidence level may be calculated for the fused result.

In different embodiments, the algorithms in a subset may be configured (e.g. by setting a decision threshold) to provide either a nominal a priori probability Ph or a nominal culling percentage. In the former case, the designer has more control to maintain the cumulative trained Pc of the entire subset. In the later case, the design has more control to provide a nominal culling percentage for the entire subset. In certain applications, this can be critical to both detecting an object in a timely manner and providing a manageable number of source data for review by the operator. In some applications, the operator may input mission timing data that defines the time critical nature of the mission for example time critical targeting (TCT). One or more of the algorithms may be reconfigured by, for example, changing a decision threshold to adjust culling percentage to either produce the result faster with fewer source data or produce the result slower with more source data output.

In an embodiment, a graphic user interface (GUI) presents the operator with a mechanism to define a query (e.g. geographic search area, object classification or identification, time critical level, etc.). The GUI displays a button for each of the retrieved source data output by the last algorithm that includes the object (or each successive algorithm as it is executed). Selection of a button may display the source data as an image, a graph, a word cloud or other visual display with an icon of the result. As each algorithm is executed, the GUI may also display an algorithm Pc and confidence value for the result. Upon completion of the chained algorithm, the GUI may also display an object Pc and confidence value. The GUI may also support operator feedback as to whether the results(s) of each algorithm in the chain, and whether the detected (and identified) object, was or was not correct.

BRIEF DESCRIPTION OF THE DRAWINGS

Various ones of the appended drawings merely illustrate example embodiments of the present disclosure and cannot be considered as limiting its scope.

FIGS. 7a-7b are diagrams of a Stochastic Math Model (SMM), according to an example embodiment, for providing dynamic feedback paths to evaluate conditional probabilities of the chained algorithms;

Figure 1:
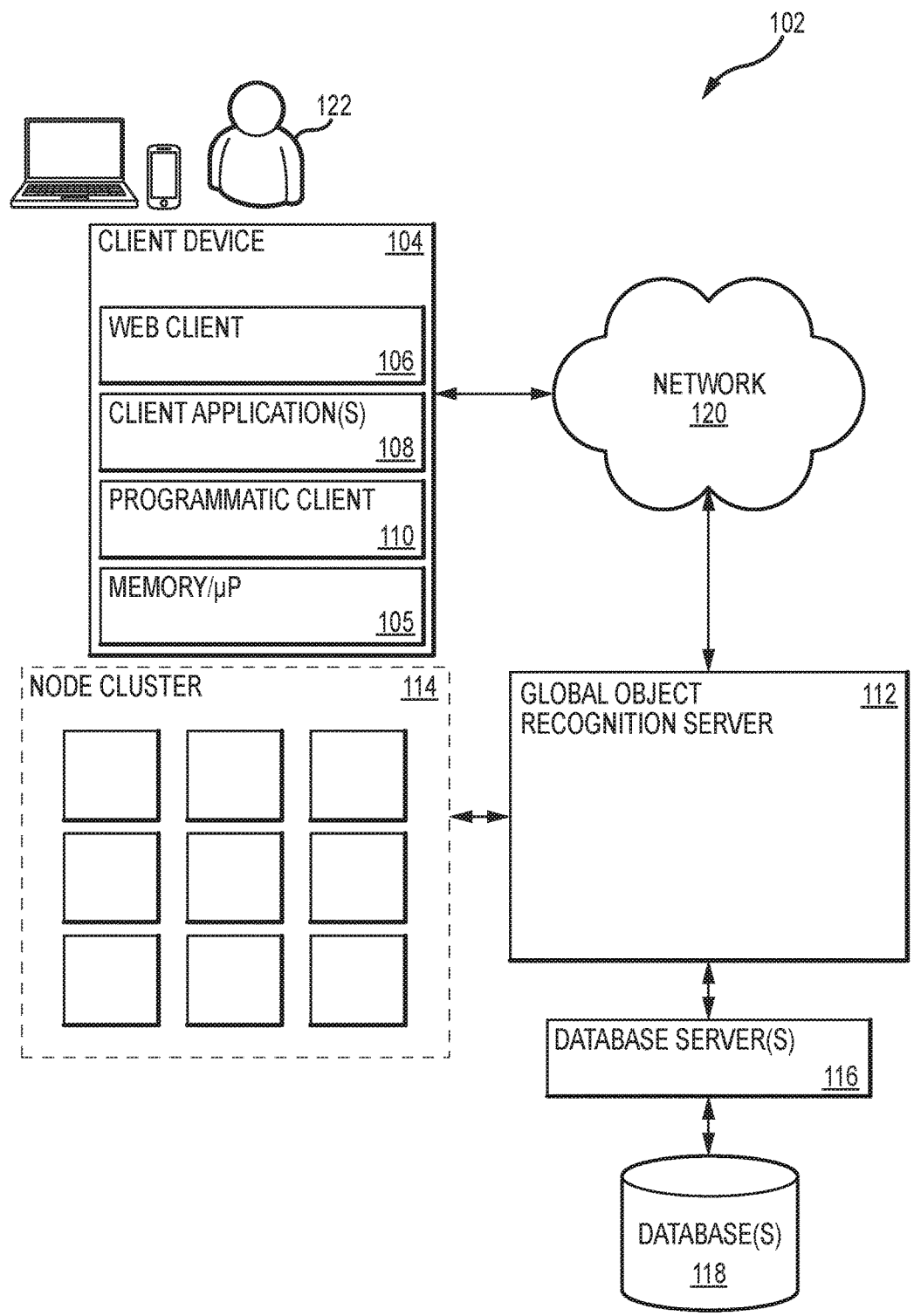
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The following disclosure provides systems and methods for rapidly screening large collections of "source data" such as sensor images (e.g., digital photographs, image frames extracted from full motion video, etc.), audio files, text, signals and human intelligence to extract elements of information (EIs) that facilitate the transformation of raw data into actionable information from which analysts can detect objects (e.g. a physical object or attributes thereof, a state of the source data, a word cloud, an intelligence source, a threat, a particular signal etc.) with fewer processing resources and within a reduced time frame compared to present methods (e.g., weeks to hours or minutes). For example, sensor images may be processed to locate lost objects in arbitrary geographic locations.

In one embodiment, the disclosed systems use a context sensitive, event detection algorithm to identify and select object recognition algorithms to achieve object recognition time reduction. Thereafter, these algorithms are executed on one or more processors, such as central processing units (CPUs) and/or graphical processing units (GPUs), depending on a given algorithm's processing requirements in a "chain" designed to reduce the expected processing load. The results from the application of a selected algorithm are then fed back into the selection process to reduce input data sets from iterative collections in similar regions. The selection and application of the algorithms may, for example, be performed on the same computer system such as a client-server architecture or split between a client-server architecture and a client device.

To improve the quality of the object recognition and to reduce the processing load, a subset of algorithms is selected based on a cumulative trained probability of correctness (Pc) that each of the algorithms, which are processed in a chain on source data of a particular data type (images, audio, text, human intelligence, signals etc.) and conditioned upon the result of the preceding algorithms, produce a correct result. The algorithms cull (selectively reduce) the source data to pass forward a reduced subset of source data in which the conditional probability of detecting the object is higher than the a priori probability of the algorithm detecting that same object. The computer-implemented method orders the algorithms based on algorithm metadata (e.g. mission relevance, processing resources and image culling percentage) to reduce an expected (average) processing load. Retrieved images are processed in order to reduce the number of source data processed by the next algorithm in the chain. At least one result indicates whether the object is detected in one or more of the source data output from the last algorithm in the chain.

To reduce the amount of time required in performing objection recognition, a processing workload may be intelligently (e.g., selectively) divided among a selected number of processing nodes (e.g., 1 to N processing nodes, where N is a whole number). The systems and methods may also include tagging to support automatic metadata associations. Based on the results from the algorithms, the systems and methods then derive stochastic probabilities for an algorithm Pc and its associated confidence level at each level in the chain and an object Pc and its associated confidence level.

Thereafter, the systems and methods create one or more visualizations showing the algorithm and object Pc and confidence levels for probable object location for a given set of parameters. The probability output results may then be fed into a planner for organizing the search of the missing object(s).

In one embodiment, source data may be retrieved and processed from one or more databases to locate a particular object. Various characteristics of the object may be defined based on one or more metadata parameters. The metadata may be used in conjunction with a search context to select one or more algorithm(s) to perform the object recognition. For example, the system may contain an algorithm metadata catalog, which may contain characteristics for one or more the image processing algorithms.

Examples of metadata may include, but are not limited to: characterizing performance (e.g., Big-O), memory requirements, estimated runtime for various input resolutions and sample counts, geographic dimension applicability (land vs water or both), functional type applicability (building, car, person), and other such defined metadata parameters such as an a priori probability of correctness Ph and a culling percentage. By representing algorithm characteristics in metadata, the system dynamically and autonomously creates a chaining solution to facilitate the identification of a missing object.

As the various algorithms may leverage different input parameters, the disclosed systems and methods define common application programming interfaces ("APIs") for the algorithms. The systems and methods may then build multi-path algorithm chains to increase overall processing speed by reducing input data sets. In one embodiment, optimal path selection options may include automatically building the multi-path algorithm chain based on a context, manually building the multi-path algorithm chain based on user input, or combinations thereof. Results from the processing of the source data include, but is not limited to a probability of object detection and associated confidence intervals, changes in probability of an object being located at a given geographic location over time, and other such results.

With reference to FIG. 1, an example embodiment of a high-level client-server-based network architecture 102 is shown. A global object recognition server 112 provides server-side functionality via a network 120 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on client device 104. The global object recognition server 112 further communicates with a node cluster 114 that includes one or more network nodes and one or more database servers 116 that provide access to one or more databases 118.

The client device 104 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, or any other communication device that a user may utilize to access the global object recognition server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, global positioning system (GPS) devices, and so forth. The client device 104 may be a device of a user that is used to perform a transaction involving digital items within the global object recognition server 112. In one embodiment, the global object recognition server 112 is a network-based appliance that responds to requests to find an object that may have been captured in one or more source data (e.g., satellite images or full-motion video). One or more users 122 may be a person, a machine, or other means of interacting with client device 104. In embodiments, the user 122 is not part of the network architecture 102, but may interact with the network architecture 102 via client device 104 or another means. For example, one or more portions of network 120 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 104 may include one or more applications (also referred to as "apps") such as, but not limited to, a web browser, messaging application, electronic mail (email) application, a global object recognition server access client, and the like. In some embodiments, if the global object recognition server access client is included in a given one of the client device 104, then this application is configured to locally provide the user interface and at least some of the functionalities with the application configured to communicate with the global object recognition server 112, on an as needed basis, for data and/or processing capabilities not locally available (e.g., access to a database of items available for sale, to authenticate a user, to verify a method of payment, etc.). Conversely if the global object recognition server access client is not included in the client device 104, the client device 104 may use its web browser to access the search functionalities of the global object recognition server 112.

One or more users 122 may be a person, a machine, or other means of interacting with the client device 104. In example embodiments, the user 122 is not part of the network architecture 102, but may interact with the network architecture 102 via the client device 104 or other means. For instance, the user provides input (e.g., touch screen input or alphanumeric input) to the client device 104 and the input is communicated to the networked system 102 via the network 120. In this instance, the global object recognition server 112, in response to receiving the input from the user 122, communicates information to the client device 104 via the network 120 to be presented to the user 122. In this way, the user 122 can interact with the global object recognition server 112 using the client device 104.

Each client device 104 may include processors and memory 105 required to perform some or all of the processing of source data performed by the global object recognition server 112 and node cluster 114. For example, in certain embodiments the global object recognition server 112 and node cluster 114 perform the computationally intensive tasks of evaluating and selecting a defined subset of algorithms in a particular order for a given object in non-real-time while the client device 104 performs the real-time task of executing the chained algorithms on a set or source data to detect an object. Chaining of the algorithms to reduce the expected processing load is critical when implemented on the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the global object recognition server 112 is communicatively coupled to a node cluster 114 and one or more database server(s) 116 and/or database(s) 118. In one embodiment, the node cluster 114 includes one or more loosely or tightly connected computers (e.g., network nodes) that work together so that, in many respects, the node cluster 114 is viewed as a single system. The nodes of the node cluster 114 may be connected through one or more communication mediums, such as Ethernet, fiber optic cable, etc., and form a local area networks ("LAN"), with each node running its own instance of an operating system. In some embodiments, each of the nodes of the node cluster 114. However, in alternative embodiments, the nodes may include different operating systems and/or different hardware. While the node cluster 114 is shown as a single cluster, one of ordinary skill in the art will appreciate that the node cluster 114 may include multiple clusters, which may be geographically disparate or local.

The global object recognition server 112 communicates with the node cluster 114 to assign object recognition processing tasks to the various individual nodes. Accordingly, each of the nodes include a client application for receiving the tasks from the global object recognition server 112 which, as discussed below, may include one or more algorithms to apply to source data. As the nodes of the node cluster 114 complete their assigned tasks, the nodes communicate their results to the global object recognition server 112, which then incorporates such results into a larger result set. In this manner, the global object recognition server 112 can use the node cluster 114 to complete object recognition and processing tasks in a more efficient and expeditious way than it could if it were to perform the tasks itself. However, in some embodiments, the node cluster 114 is unavailable to the global object recognition server 112, in which case, the global object recognition server 112 performs the object recognition and processing tasks itself.

The global object recognition server 112 and node cluster 114 execute the algorithms in a subset according to the order of the chain on the source data. Each algorithm removes some of the source data to reduce the processing load of the next algorithm and suitably to improve the conditional probability that the next algorithm produces a correct result. Accordingly, to preserve the "chaining" the algorithms are not executed in parallel on different processing nodes. However, the node cluster 114 can be used to batch process multiple source data through a given algorithm or to processes different tasks for a given algorithm.

The database server(s) 116 provide access to one or more database(s) 118, which include source data comprising images, audio files, text files, signals or human intelligence. The global object recognition server 112 communicates with the database server(s) 116 to retrieve source data from the database(s) 118. In different embodiments, the global object recognition server 112 requests specific source data from the database(s) 118 or source data corresponding to particular search criteria. In one embodiment, the global object recognition server 112 requests specific images from the database(s) 118. In another embodiment, the global object recognition server 112 requests images corresponding to one or more geographic locations (e.g., North America, Europe, the Middle East, etc.). In yet a further embodiment, the requests include latitude and longitude coordinates, which the database server(s) 118 then use to retrieve images corresponding to such latitude and longitude coordinates. Examples of organizations that provide access to such satellite imagery include the National Geospatial-Intelligence Agency, the United States Air Force Research Laboratory, TerraServer, and other such organizations. As discussed below, the retrieved source data are then processed by the node cluster 114 and/or the global object recognition server 112 according to a set of object parameters to determine whether the retrieved source data include the object being searched.

Figure 2:
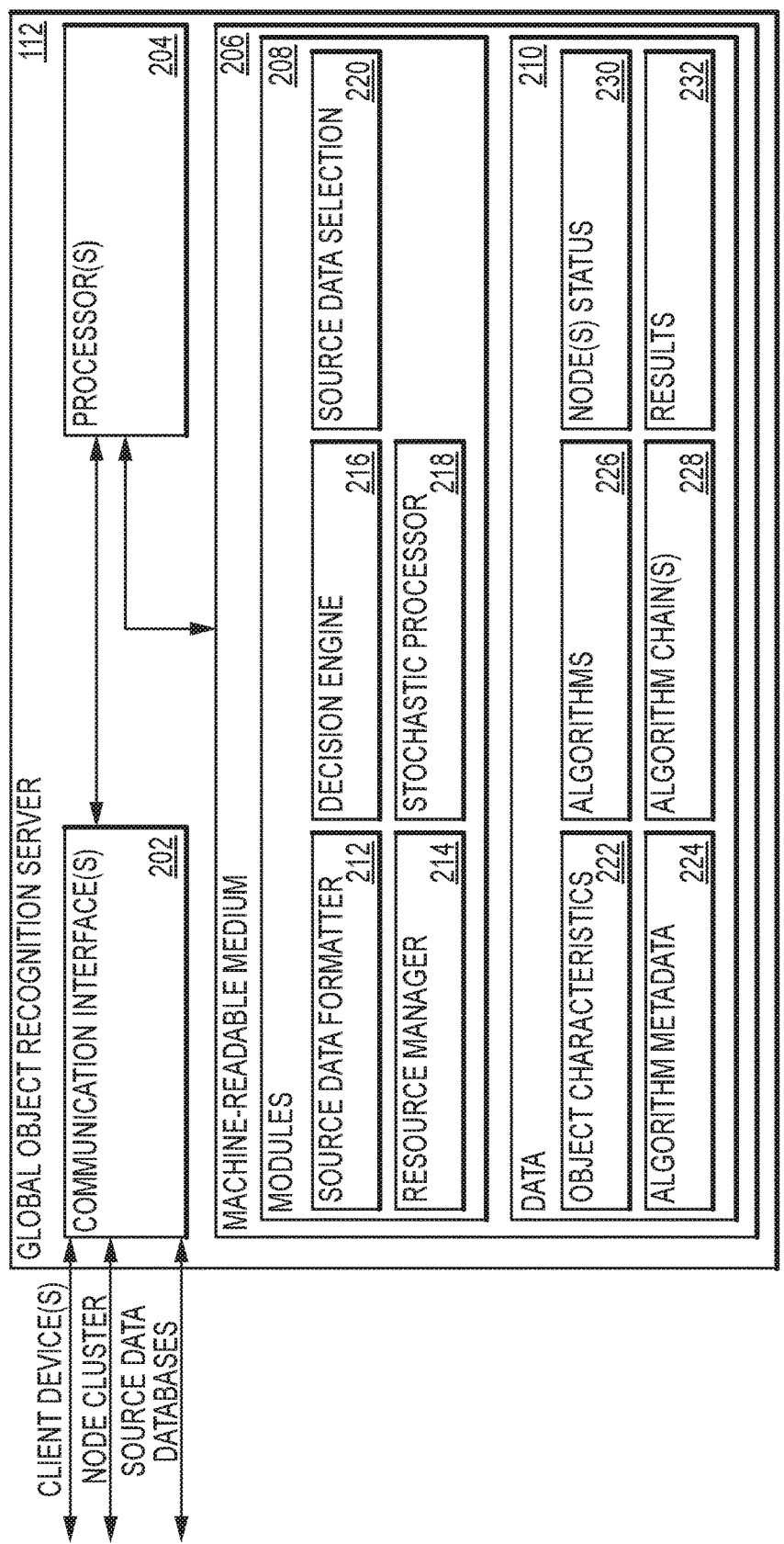
FIG. 2 is a block diagram illustrating the components of a global object recognition server illustrated in FIG. 1, according to an example embodiment.

FIG. 2 is a block diagram illustrating the components of a global object recognition server 114 illustrated in FIG. 1, according to an example embodiment. In one embodiment, the global object recognition server 112 includes one more communication interfaces 202 in communication with one or more processors 204. The one or more processors 204 are communicatively coupled to one or more machine-readable mediums 206, which include modules 208 for implementing the disclosed global object recognition server 112 and data 210 to support the execution of the modules 208.

The various functional components of the global object recognition server 112 may reside on a single device or may be distributed across several computers in various arrangements. In addition, the various functional components may be replicated in the client device 104 to execute the chained algorithms on source data during an operational phase. The various components of the global object recognition server 112 may, furthermore, access one or more databases (e.g., databases 118 or any of data 210), and each of the various components of the global object recognition server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the global object recognition server 112 and the client device(s) 104, the node cluster 114, and one or more database server(s) 116 and/or database(s) 118. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable medium 206 includes various modules 208 and data 210 for implementing the disclosed global object recognition server 112. The machine-readable medium 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Electrically Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as a "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 1, the source data selection module 220 is configured to retrieve source data from the databases 118. The source data may include various types of imagery, audio, text, signals and human intelligence, for example. Imagery may include terrestrial imagery, such as land-based images, water-based images, or combinations thereof (e.g., images of beaches, lakefronts, etc.). Furthermore, the images may be of various types of satellite imagery including, but not limited to, visible imagery, infrared imagery, water vapor imagery, and near infrared imagery. The images may also be in various types of formats including, but not limited to, JPEG, GIF, PNG, BMP, TIFF, or other image format type now known or later developed. Audio may include analog or digital recordings. Text may include documents, transcriptions of audio files, social media such as emails, texts, tweets or postings to social media sites. Signals may include any sensor based signal such as optical, electrical, microwave or acoustical. Human intelligence may include human analysis of any of the above categories or direct observations or interviews.

To determine which source data to retrieve from one or more of the databases 118, the source data selection module 220 is provided with one or more context parameters that define a search for an object. For example, in a geographic search of images the context parameters may include, but are not limited to, latitude coordinates, longitude coordinates, descriptive terms (e.g., "water," "beach," "mountain,"), proper nouns (e.g., "Japan," "United States," "California," etc.), and other such parameters or combinations thereof. In one embodiment, the context parameters include a range of latitude coordinates and a range of longitude coordinates, which the source data selection module 220 then provides to the database server(s) 116 to retrieve the corresponding images.

Furthermore, and in various embodiments, the source data module 220 retrieves the source data from different databases 118. For example, the source data selection module 220 may receive images of the same, or nearly the same, geographic location from a first image provider and a second image provider (or third, fourth, fifth, etc., image provider). While this implementation has the benefit of obtaining images from different sources (such as where the first image provider may have a different collection of images than a second image provider), this implementation also introduces the possibility of processing images of geographic locations that have already been processed. Accordingly, and as discussed below, as the global object recognition server 112 processes the retrieved images, the source data selection module 220 is configured to remove redundant or irrelevant images from the image processing queue. The source data selection module 220 may remove the redundant or irrelevant images by comparing timestamps (e.g., older images may be considered less relevant than newer images of the geographic location), metadata associated with the images (e.g., latitude and/or longitude coordinates associated with an image), and other such image parameters. In this manner, the source data selection module 220 facilitates removing images from the image processing queue that may be redundant or irrelevant to the object search. The same applies for non-image source data.

The modules 208 also include a source data formatter 212 for formatting the retrieved source data. As discussed above, the images obtained from the various databases 118 may be in different format types. Furthermore, the images may have different image characteristics, such as color spaces (e.g., 8-bit color, 16-bit color, etc.), different resolutions (e.g., 300 DPI, 700 DPI, etc.), different sizes (e.g., 1024×768, 640×480, etc.), or other such characteristics. Accordingly, the source data formatter 212 is configured to format (e.g., normalize) the images to a canonical or standard format. For example, the images may be converted to a PNG format, with a resolution of 600 DPI, and a size of 1024×768. Of course, other formats and/or other image characteristics are also possible. Furthermore, such characteristics may be selectable by a user or preconfigured prior to execution of the object search. The same may apply for non-image source data.

The decision engine 216 is configured to define a subset including multiple functional levels and to determine which algorithms 226 to select and the order in which the algorithms are chained in processing the retrieved images. The decision engine 216 makes this determination based, at least in part, on a cumulative trained Pc for the chained algorithms and an expected processing load. In an embodiment, the first N-1 algorithms pre-filter the source data to provide a reduced set of source data to an $N^{th}$ object recognition algorithm. The source data is selectively reduced to improve the conditional probability of object detection by the $N^{th}$ algorithm. In another embodiment, each of the N algorithms provides evidence of the object, and reduces the amount of source data processed by the next algorithm. The decision engine assesses the cumulative evidence provided by the results of the chained algorithms to detect the object. The functions of the decision engine 216 to select and order algorithms in a subset ("training") and to then execute the order algorithms on a set of source data ("operations") may, in different embodiments, be combined, may be separate processes both executed on a client-server architecture, or may be separate processes with the training executed in non-real-time by the client-server architecture and the operations performed in real-time by a client device.

In one embodiment, the algorithms 226 are associated with corresponding algorithm metadata 224. Examples of algorithm metadata 224 include, but is not limited to, characterizing performance (e.g., Big-O), memory requirements, estimated runtime/processing load for various input resolutions and sample counts, culling percentage, geographic dimension applicability (land vs water or both), functional type applicability (building, car, person), and other such defined metadata parameters. Audio metadata may include pitch, harmonics, tone, reverberation and volume. Text metadata may include word repetition, names and language. Human intelligence metadata may include indicators, warnings and geolocation coordinates for example. Signal metadata may include temperature (IR), illumination (EO), shape, SNR and radio frequency.

Prior to conducting the object search, a user provides the global object recognition server 112 with object characteristics 222 that describe the object being searched. For example, the user may provide whether the object is an airplane, boat, vehicle, building, the object's dimensions, whether the object is a complete or partial object, the type of object (e.g., model of airplane, boat, or vehicle), and other such characteristics. In conjunction with the previously provided context parameters, the decision engine 216 selects those algorithms 226 that best satisfy the object characteristics and the context parameters to provide an acceptable Pc and orders the algorithms to reduce the expected processing load. Algorithms with a small processing load and high culling percentage are preferably placed early in the chain. Examples of algorithms 226 that are available for selection by the decision engine 216 include a geography detection algorithm that determines whether an image depicts a land-based image or a water-based image, a ship detection algorithm that determines whether a water-based image includes a ship, an advanced search protocol algorithm that determines whether a land-based image includes a vehicle and/or a building, and algorithms that identify a potential model of ship or vehicle depicted in a selected image. One of ordinary skill in the art will recognize that these algorithms are also used in conventional object searching techniques.

In addition, the decision engine 216 builds one or more algorithm chains 228 that indicate the order in which the algorithms 226 are to be executed, such as by the global object recognition server 112, the node cluster 114, or both. The decision engine 216 builds the algorithm chains 228 based on the previously provided context parameters and object characteristics. The decision engine 216 may build the algorithm chains 228 by comparing the algorithm metadata 224 with the provided object characteristics and context parameters. An example of a non-real-time process for selecting and chaining algorithms is discussed with reference to FIGS. 4, 5 and 6 further below.

The resource manager module 214 is configured to manage the resources and assets available to the global object recognition server 112, including the retrieved images, the selected algorithms, the one or more processors 204, and available nodes of the node cluster 214. In one embodiment, the data 210 include a set of node status data 230 that informs the resource manager 214 of the status of a given node, such as whether the node is available, is processing an assigned image or images, has completed processing, or provides other such status information.

The resource manager module 214 is responsible for assigning algorithms and source data to various nodes to execute the chained algorithms in order, and then incorporating the results of the processing performed by the nodes with a final result set. Accordingly, a network node may include a client application in communication with the resource manager module 214 for receiving new tasks and providing corresponding results. As results are received and/or obtained, the resource manager module 214 incorporates such results into the results data 232. In one embodiment, the results data 232 include source data that have been identified as likely having an object matching one or more of the object characteristics previously provided. In addition, as source data are processed, the resource manager 214 coordinates with the source data selection module 220 to remove the source data that were previously selected but would be redundant.

After obtaining the results 232, the stochastic processor 218 builds a visual layout of occurrences of the object that is the subject of the being searched. Accordingly, the stochastic processor 218 implements one or more stochastic math models for analyzing the results 232 obtained by the resource manager 214. In one embodiment, the stochastic processor 218 generates a visualization, such as a word cloud, representing the frequency of occurrence of an object within and audio or text file based on results 232. In a different embodiment, the stochastic processor 218 generates a visualization, such as a heatmap, representing a plurality of images and a plurality of locations within an image where the object being searched is likely to be located based on the results 232. In another embodiment, the stochastic processor 218 builds a timeline of heatmaps that change over time, reflecting the changes in probability that the object being searched is likely to be located in a given image at a location. For this embodiment, such changes include, but are not limited to, ocean currents that may cause an object to drift, earthquakes or volcanoes that may cause the object to move from one location to another, and other such phenomenon. The stochastic processor 218 could also be configured to account for man-made phenomena that may impact the occurrence and/or location of an object being searched, such as conflicts, sentiment, interference, spoofing, automotive traffic congestion, ocean ship traffic, and other such man-made phenomena.

Figure 3A:
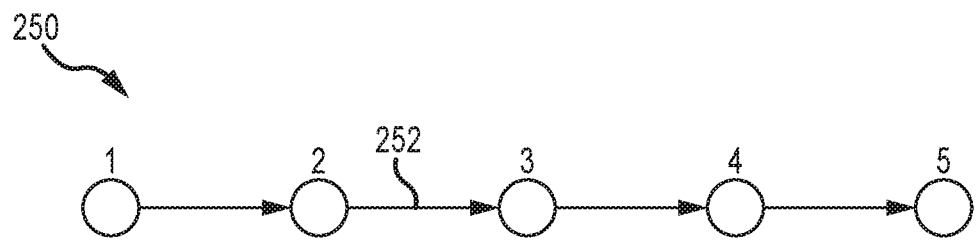
FIGS. 3*a* through 3*c* are different embodiments of a subset of chained algorithms.
Figure 3B:
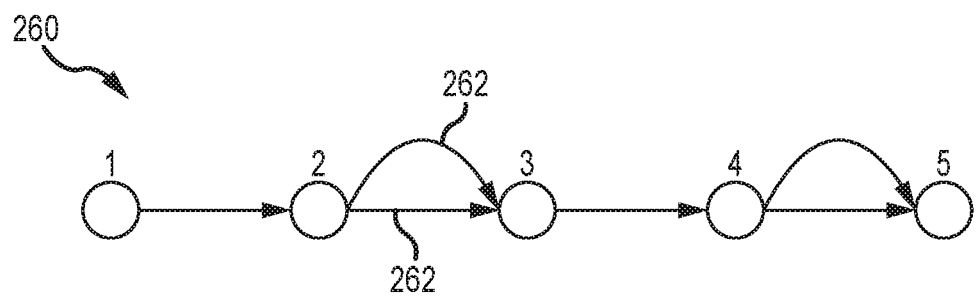
Figure 3C:
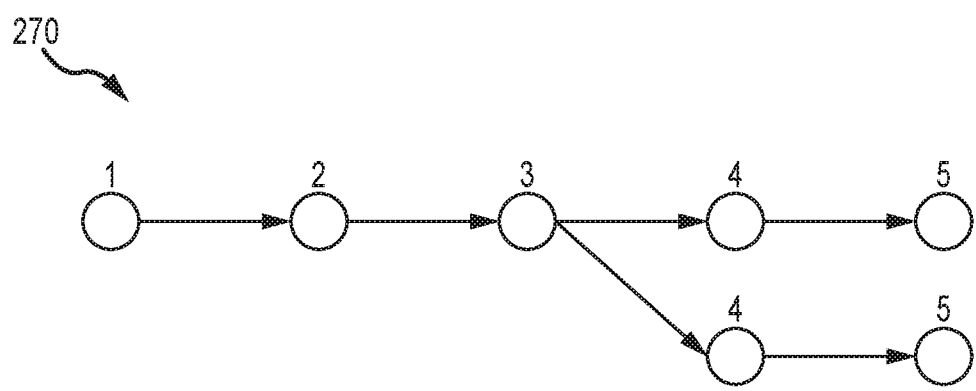

FIGS. 3a, 3b and 3c are diagrams illustrating different embodiments of chained algorithms that make up a multi-level subset. All of the algorithms in a subset are configured to process source data of a given data type e.g., images, audio, text, human intelligence or signals. Each level in the subset represents a particular processing function, which may be performed by one or more algorithms. A subset may branch to effectively form two subsets that perform different object recognition tasks. FIG. 3a illustrates a generic 5-level chain 250 in which a single link (algorithm) 252 processes source data from the prior level and passes forward a reduced subset of source data to the next level. The cumulative processing outputs a winnowed set of source data that likely includes the object, which may be reviewed by a human operator. The cumulative processing computes and outputs a cumulative algorithm Pc and its confidence interval for each level and a cumulative object Pc and it confidence interval for the detected object. FIG. 3b illustrates a 5-level chain 260 in which multiple links (algorithms) 262 are used to connect levels in the chain. Each algorithm processes the source data from the previous level. The results of the algorithms are fused and passed to the next level. This approach may be used to attain a desired cumulative Pc at the next level or to combine efficient algorithms in place of a single less efficient algorithm. FIG. 3c illustrates a 5-level chain 270 in which the chain branches into two separate chains to perform different object recognition tasks. This approach may be used when it is desirable to run both tasks and the tasks share common algorithms.

Figure 4:
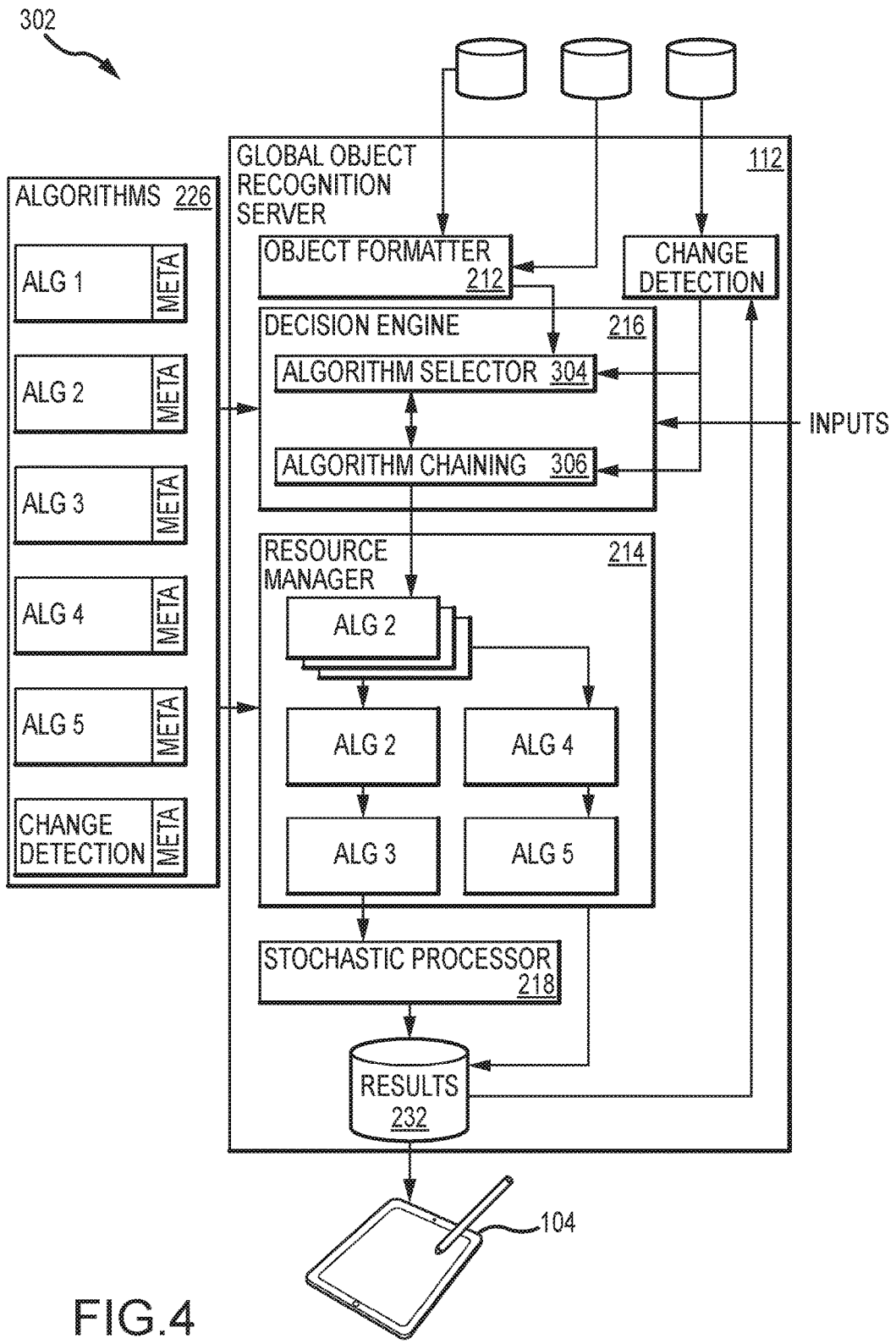
FIG. 4 is a block diagram illustrating a process flow of the global object recognition server in performing object recognition according to an example embodiment.

FIG. 4 is a block diagram illustrating a process flow 302 of the global object recognition server 112 in performing object recognition according to an example embodiment. As shown in FIG. 3, the source formatter 212 retrieves source data of a particular data type (image, audio, text, signals or human intel) and formats the retrieved source data according to a specified format. For images this might be image type, size, resolution, color space, etc. The formatted source data are then communicated to the decision engine 216, which includes algorithm selection logic 304 and algorithm chaining logic 306.

As discussed previously, one or more algorithms 226 may be selected and chained based on the previously provided context parameters, object characteristics and particular data type. The decision engine 216 may select and chain the algorithms in real or near real-time to define the subset that is used to process the source data. Alternately, the decision engine 216 may execute a non-real-time evaluation of training source data to select and chain the algorithms to define a subset that is paired with the object and stored in a repository for later application. In this later case, the decision engine 216 can select a subset that is optimized for a cumulative trained Pc, expected processing load, time to object detection or culling percentage or some weighted combination thereof. The decision engine 216 may receive inputs that specify relative weights for or constraints on the cumulative trained Pc, expected processing load, time to object detection or culling percentage. The non-real-time evaluation allows for a more robust and rigorous definition of the subsets to better ensure a high trained Pc and minimal processing load. The latter is particularly important in instances where processing of operational source data by the chained algorithms is performed on a client device having limited processing resources and/or a time critical targeting (TCT) requirement.

After the algorithm chain(s) are formulated, the chain(s) and the retrieved images are communicated to the resource manager 214. The resource manager 214 then coordinates the processing and object detection among the various assets available to the global object recognition server 112, including one or more local resources (e.g., hardware processors, memory, etc.) and/or networked resources (e.g., network nodes).

As the source data are processed, the results of the processing may then be communicated to the stochastic processor 218. In one embodiment, results from each level in the chain are communicated to the stochastic process 218 to compute (and display) an algorithm Pc and its confidence interval. In one embodiment, results of the object detection (either just the last level or cumulative evidence from all levels) are communicated to the stochastic process 218 to compute (and display) an object Pc and its confidence interval. These statistics are used both during the non-real-time evaluation and selection of algorithms for the subset to compute conditional probabilities and qualify/disqualify algorithmic paths and the real-time processing of operational source data to provide the Pc and confidence of object detection.

The global object recognition server 112 may also employ a change detection algorithm that is designed to retrieve source data where the source data is compared to historical data to observe any difference between present and past states of the object. For example, images may be retrieved from a database of historic source data that identifies where the object was previously located, i.e. a port. As shown in FIG. 4, the change detection algorithm compares this historic source data with new source data obtained from new images to determine if the object location has changed. Depending on the outcome, the change detection algorithm may determine that a new algorithm chain would provide better results and provide this recommendation to the decision engine. The decision engine may use this recommendation to affect the next source data retrieved by the global object recognition server 112 and the algorithms selected and/or chained by the decision engine 216.

Visualizations of the results are then displayed on a display, such as the client device 104. As shown in FIG. 4, the client device 104 may be a tablet or other touch-sensitive device.

In general, in the non-real-time training phase the decision engine evaluates a number of candidate subsets and picks one, suitably a best one, based on a weighted combination of one or more terms including a cumulative trained Pc, expected processing load, time to object detection and culling percentage. Each of these terms may be expressed as terms of a merit function to be optimized (minimized or maximized), as constraints on a solution to the merit function or a combination thereof. In an embodiment, the merit function may be W1*Pc+W2*(1/Expected Processing load)+W3*(1/time to object detection)+W4*(culling percentage). In another embodiment, the merit function may be W1*Pc+W2*(1/Expected Processing load) subject to the constraint that the time to objection detection is (on average) <10 seconds and the nominal culling % is >90%.

The cumulative trained probability of correctness Pc=P(Level n|Level(n−1)) . . . P(Level3|Level2) P(Level2|Level1) P(Level1|h) P(h) where P(h) is the a priori probability of the first algorithm in the chain. Pc is the cumulative probability of correctness that each of the algorithms, which are processed in a chain and conditioned upon the result of the preceding algorithms, produce a correct result. As described below, each of the conditional probabilities must be derived via extensive testing for a given chain. Inherently, the cumulative Pc is a monotonically non-increasing value and, in practice, a monotonically decreasing value.

Careful selection and ordering of the algorithms is critical for a number of applications and reasons. First, to rely and act on the object detection one must have confidence in the results. The cumulative trained Pc and its confidence interval (e.g., standard deviation) provide a reliable metric for evaluating the efficacy of the chained algorithms. Second, in certain applications the operational phase is performed on a client device with limited processing and memory resources. Intelligent selection and chaining of the algorithms can greatly reduce the expected processing load, as compared to running a single object detection algorithm, which is typically very complex, on all of the source data. In many applications in which a client device would be used during the operational phase, the time to object detection and presentation of the results to the operator is time critical. The chained algorithm may reduce the time to detection, even compared to parallel or distributed processing solutions. Lastly, in many applications the human operator must review the source data or a visualization of the source data that is determined to contain the object and verify object detection before any action is taken. Reducing the source data that is presented to the operator for review and maintaining the best source data for detection enhances operator review.

The decision engine could, in theory, fully evaluate each of the candidate subsets and pick one, or the best one, that satisfies a decision criteria. However, the combinatorial nature of evaluating every combination of algorithms makes doing so prohibitive, and further it is unnecessary. First, candidate subsets may be disqualified based on their expected processing load. If the processing load exceeds a defined threshold, then the subset may be disqualified. Second, the cumulative trained Pc of a subset can be calculated and compared to a threshold at each level. If the Pc is less than the threshold then that path is disqualified. The process may then identify a different algorithm that satisfies the threshold. Third, if the confidence interval associated with the Pc is too large, the path may be disqualified or subjected to additional training to improve the confidence interval. Fourth, if the chained algorithms are passing forward the best source data for object detection, then the conditional probability at each level in the chain should be measurably higher than its a priori probability. If this is not true, then the path may be disqualified and a different construct of the subset evaluated.

Figure 5:
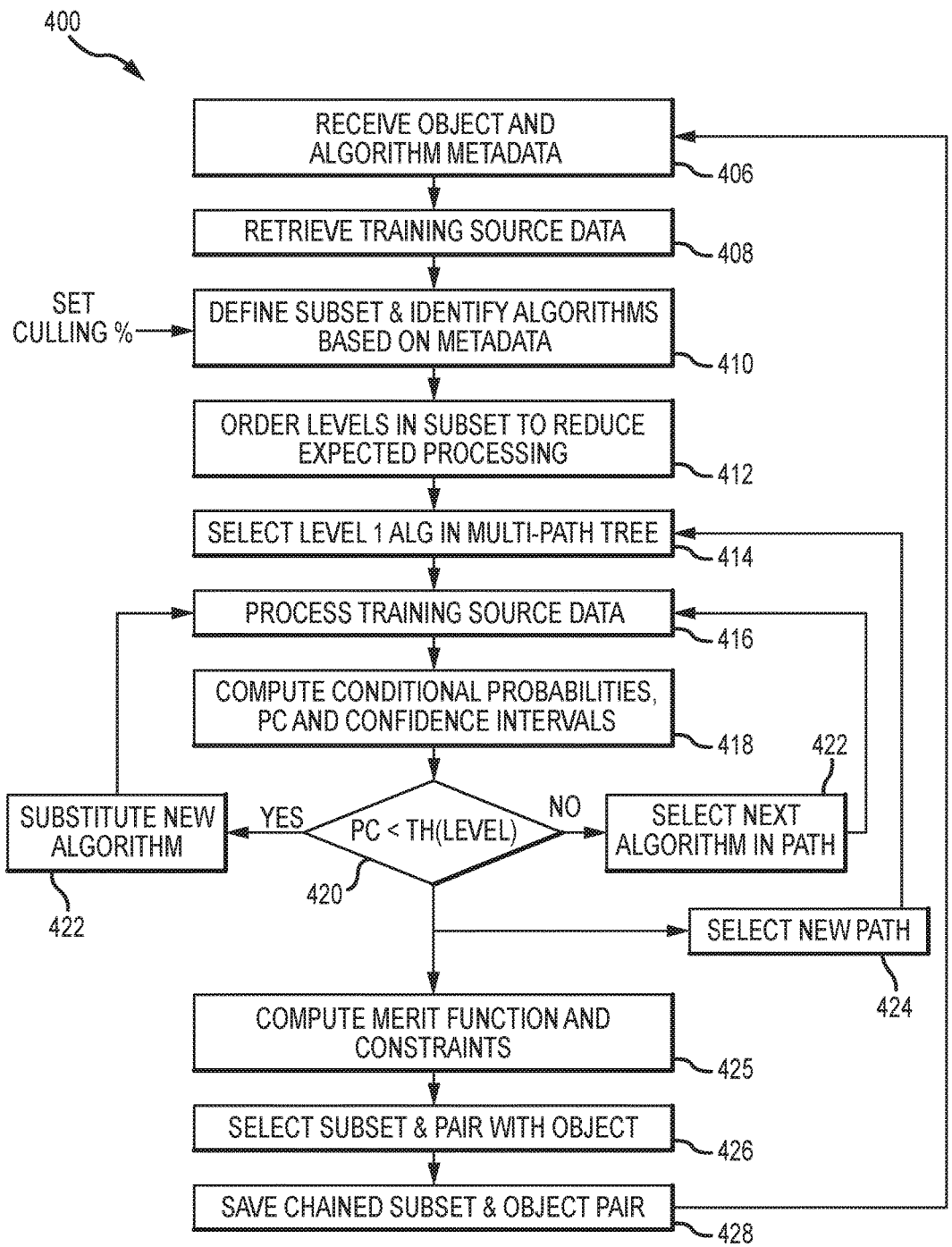
FIG. 5 illustrates a method, according to an example embodiment, for offline evaluation and pairing of chained subsets with object recognition missions to perform object recognition by the global image recognition server.
Figure 6:
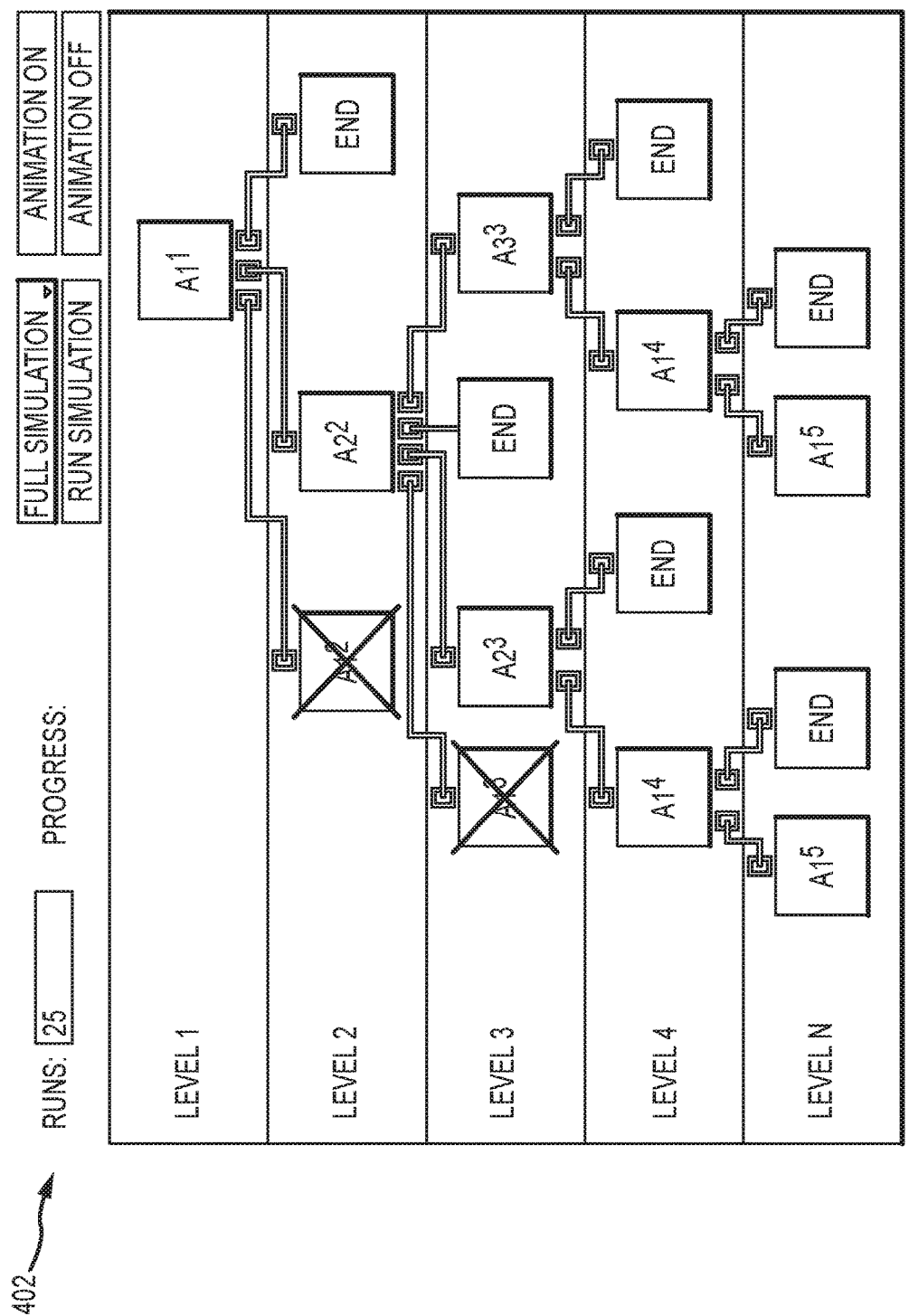
FIG. 6 illustrates a multi-path tree for evaluating candidate chained sub sets.

FIGS. 5, 6 and 7 are, respectively, a process flow diagram 400, a multi-path tree 402 and a Stochastic Math Model (SMM) 404 illustrating an embodiment of a non-real-time training process for creating and evaluating candidate subsets for a particular data type based on their cumulative trained Pc and confidence interval at each level of the chain. The decision engine may then select one of these candidate subsets based on the trained Pc and other factors such as expected processing load, time to detection and culling percentage.

The decision engine receives object and algorithm metadata (step 406) and retrieves training source data of the particular data type (step 408). Based at least in part on the metadata and data type, the decision engine defines the structure of the subset e.g., the number of levels and functions performed by the different levels to perform the task of object detection, and identifies one or more possible algorithms or instantiations of a single algorithm to perform the designated function at each level (step 410). A nominal culling % for the entire subset or each level of the subset may be specified. A decision threshold in each of the algorithms can be set according to the nominal culling %. The decision engine orders the levels in the subset to reduce an expected processing load based on the processing requirements and nominal culling percentage at each level (step 412). In general, the levels with lower processing requirements and/or a higher culling percentage are placed at the front of the chain and the algorithms with higher processing requirements are placed towards the end of the chain.

In an embodiment, the decision engine, resource manager and stochastic processor identify the algorithms, resources, and processing required to implement a stochastic math model (SMM) to compute the Pc at each level and the cumulative Pc at the Nth level. A discrete event simulator (DES) computer model implements the SMM and additionally performs a Monte Carlo simulation on multiple instances of the object in the source data to generate the confidence intervals corresponding to the Pc at each level including the cumulative Pc at the Nth level.

The decision engine selects an algorithm $A1^1$ ($1^{st}$ algorithm, level 1) (step 414). The resource manager allocates processing resources to feed a set of training source data through algorithm $A1^1$ (step 416), which passes a reduced subset of the training source data ("results") forward to the next level and removes ("End") the remaining source data. As described below, the stochastic processor uses a DES to implement the SMM and perform a Monte Carlo analysis to compute the conditional probability for the current level, the cumulative trained Pc and its confidence interval (step 416). The decision engine compares the cumulative trained Pc against a threshold (step 418). If Pc>threshold, the decision selects the next algorithm in the path (step 420) and returns to step 416 to process the training source data passed forward from the last level. If Pc<threshold, the decision engine substitutes a new algorithm at the current level (step 422) and returns to step 416 to reprocess the training source data. The threshold is reduced at each level of the chain. This process continues until a path (subset) is identified. The process may be repeated for a different path (step 424) to identify multiple candidate subsets whose Pc satisfies the threshold criteria at each level. Furthermore, candidate subsets may be generated for different subset constructs (e.g. the number of levels and function of each level) to perform the same object recognition task.

The DES implements the SMM of the cumulative Pc equation and conducts a Monte Carlo analysis to compute the conditional probability, Pc and confidence interval at each level. A Discrete Event Simulator (DES) comprises a collection of techniques that, when applied to a discrete-event dynamic system, generates sequences, called sample paths, that characterize its behavior. The collection includes modeling concepts for abstracting the essential features of a system and converting these into computer executable code that then generates the required sample-path data, outlining procedures for converting these data into estimates of systems performances, and then illustrating methods for assessing how well these estimates approximate true but unknown system behavior. This concept of modeling complex systems provides a relatively low-cost way of gathering information for decision-making. See J. Sokolowski and C. Banks. *Principles of Modeling and Simulation: A Multidisciplinary Approach*, Wiley & Sons © 2009 and G. Fishman, *Discrete-Event Simulation: Modeling, Programming, and Analysis*, Springer ©2001.

There are a number of DES tools available that enable the generation of a system model and the execution of experiments using that model as the system progresses through time. Models enable observation of how a real-world activity will perform under different conditions and to test various hypotheses. A principal benefit of a DES model is that it provides a simple approximation of a process and enables a gradual refinement of the model as understanding of the process improves. This "stepwise refinement" achieves good approximations of complex problems. An example of a DES tool is ExtendSim (See *ExtendSim User Guide*, Imagine That Inc., ISBN: 978-0-9825040-1-7, © 2013 and *ExtendSim Developers Reference*, Imagine That Inc. ISBN: 978-0-9825040-4-8, © 2013) with which one can develop dynamic models of real-life processes in a wide variety of fields. ExtendSim may be used to create models from building blocks, explore the processes involved, and see how they relate. If initial assumptions change, then the inputs to ExtendSim can flexibly be changed to derive a refined solution.

Training begins with ground truth accuracy (i.e., Ph) for each algorithm (Step 1). Ph may have been derived prior to selecting the algorithm and will be used by the decision engine in selecting the initial algorithmic chain to begin training. A set of source data of a particular data type (e.g., images) is fed through the chain and the Pc and the associated confidence level is computed for each level (Step 2). This is a conditional probability $P_{c1}=P_{h1}$ where the a priori probability for the first object processed through the first level is the Ph of the first algorithm for a set of like objects. If there is only one object, the Ph of algorithm 1 becomes the conditional probability of algorithm 2 for that object $P_{c2}=(P_{c2}|P_{c1})\,P_{h1}$ (step 3). Each algorithm has an initial ground truth probability, Ph. The first time through the chain for each algorithm, the DES combines this Ph with the conditional probability of the previous algorithm $P_{c-1}$ to create the conditioned probability for the next algorithm in the chain $P_{ci}=(P_{ci}|P_{ci-1})\,P_{hi}$. As stated above, for the first algorithm in the chain, $P_{ci}=P_{hi}$, thus $P_{c1}=P_{h1}$. This process continues to the end of the chain. If there are multiple unique objects, each individual object is processed in the same way (Step 4). If there are multiple instances of an object that are processed through the chain (e.g., multiple images of the same object) then each instance is processed through the chain, and a Pc is computed at each level for the set of object instances. Additionally, a Monte Carlo analysis is conducted at each level to determine a standard deviation for the algorithm computation of all instances of the same object. This standard deviation translates in to a confidence interval to match with Pc at each level (step 5). Upon completion of processing at each level and at the end of the chain, a new Pc is feedback to serve as the next a priori probability to begin a new conditional probability (i.e., a linear Bayesian net) for the Pc and confidence interval computation of the next set of objects and object instances (step 6).

Figure 7A:
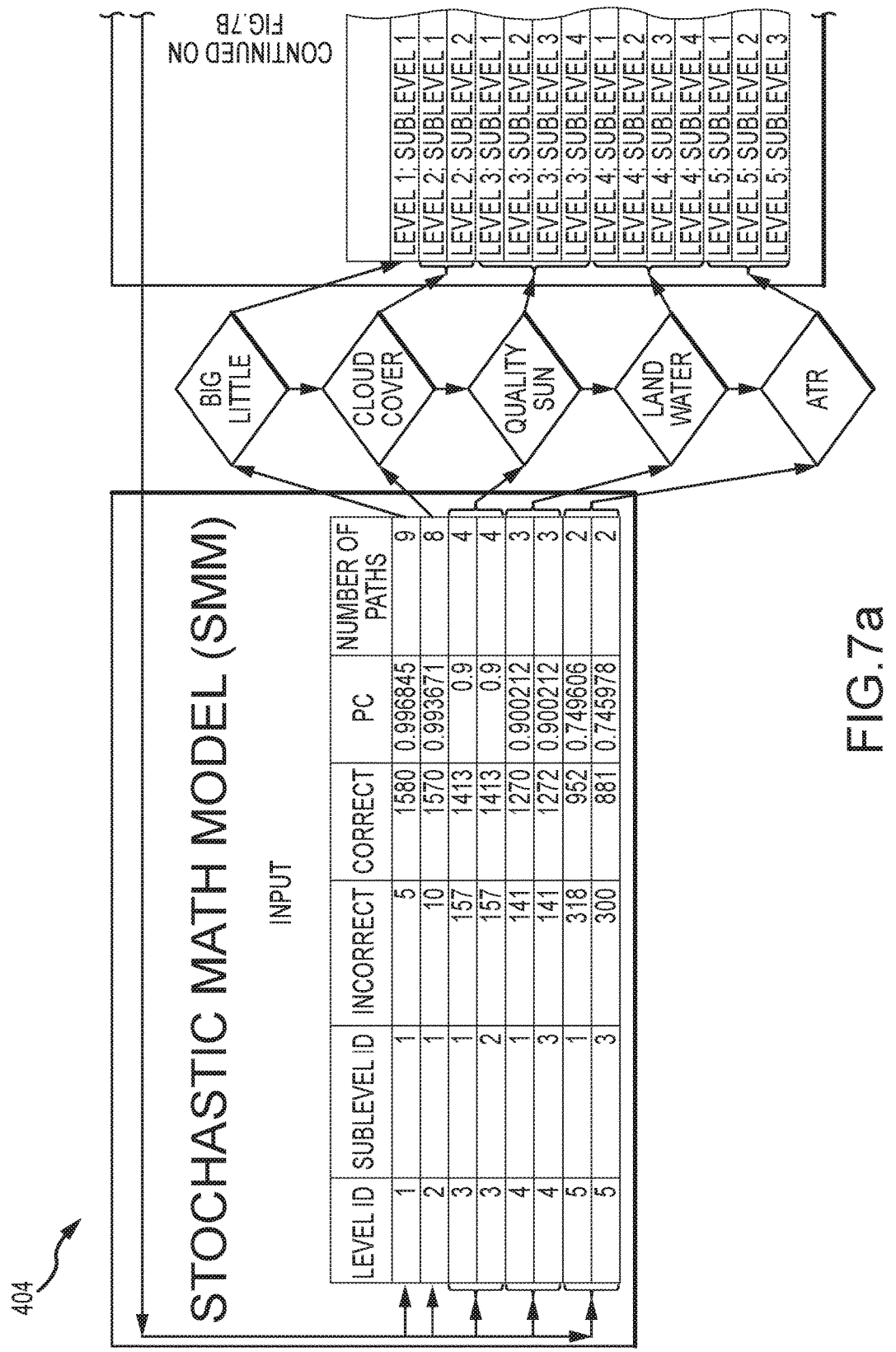

As shown in FIGS. 7a-7b, a DES implements SMM 404 and a Monte Carlo analysis that feeds an initial training set of 1585 images through the algorithmic chain. The LEVEL ID corresponds to the level in the subset. The SUBLEVEL ID is one level below that such as an alternate path. The number of INCORRECT and CORRECT images is determined the first time based on ground truth testing and thereafter based on algorithm runs on new images. The UPPER BOUND and LOWER BOUND are the Pc+/− the Standard deviation/100 and the CI UPPER and CI LOWER are the Standard deviation/100. The first time through the chain (left side of FIG. 7) the training produced a Pc of 0.996945 for level 1. No Monte Carlo analysis had yet been run. The right side of FIG. 7 shows the results of the Monte Carlo analysis in which the data set was iterated 100 times. A normal probability distribution was assumed and the standard deviation for each level was then computed. Pc and the associated confidence level is then fed back for all levels for use with next set of objects and object instances.

Referring again to FIG. 5, assuming multiple candidate subsets are identified that satisfy the criteria on the cumulative Pc, the decision engine computes a merit function (step 425) (e.g., W1*Pc+W2*(1/Expected Processing load)+W3*(1/time to object detection)+W4*(culling percentage)) subject to any additional constraints (e.g. Expected Processing Load<TH1, Time to object detection<TH2 and culling percentage>TH3), selects the subset with the best merit function and pairs the subset with the object (and any other relevant metadata that defined object recognition) (step 426). The paired object and subset are saved in a repository (step 428) and the entire process is repeated for either the same object but different data types (e.g., audio, text etc.) or for different objects.

Figure 8A:
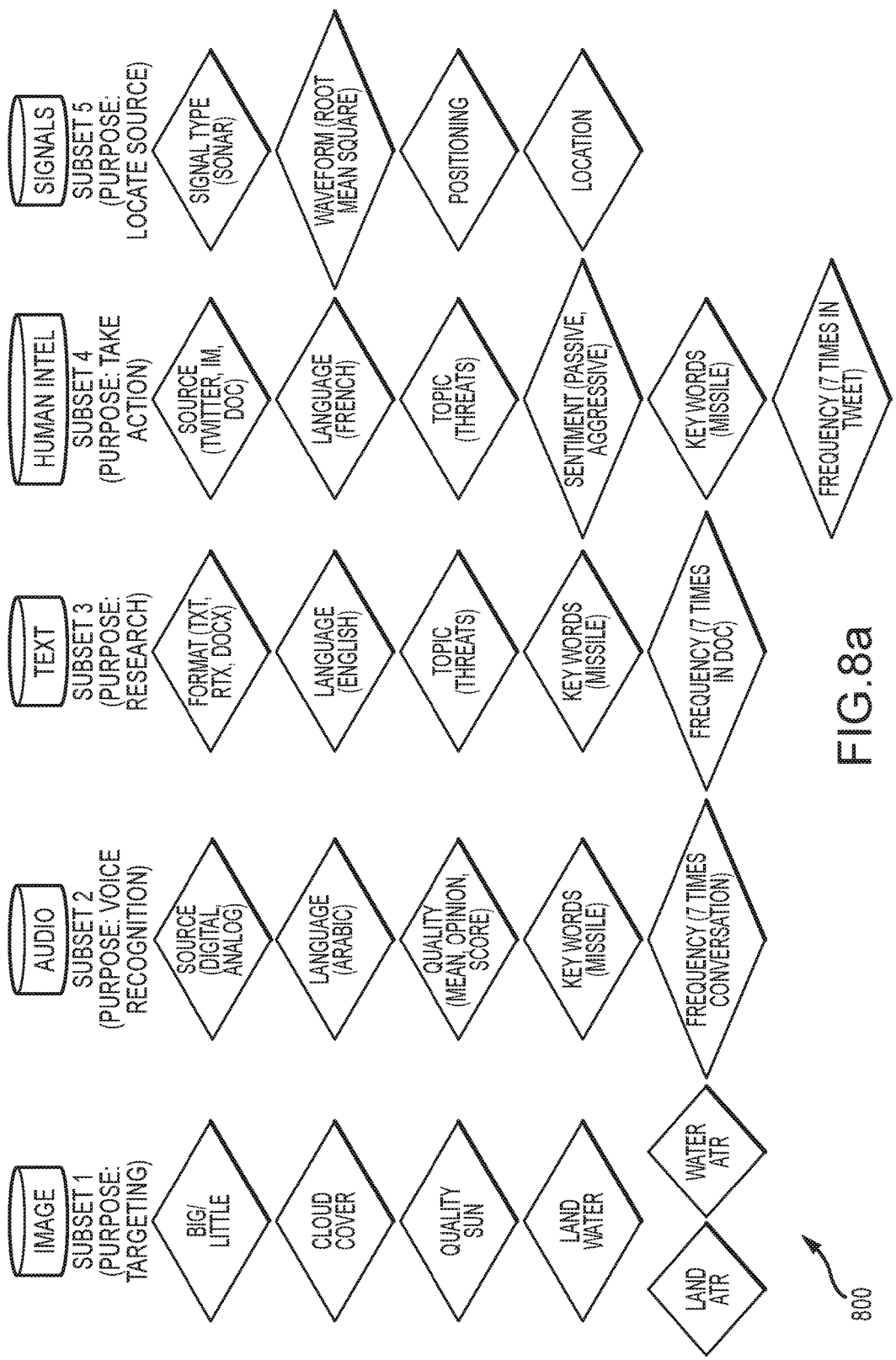
FIGS. 8a and 8b illustrate an embodiment of predefined chained subsets for different data types and an embodiment of fusing the results of the different subsets.

FIG. 8a is a depiction of subsets of chained algorithms 800 for each of 5 different data types; image, audio, text, human intel and signals. In this example, each chain is configured to detect a different object. The image chain is configured to detect either land or water objects (e.g., a tank or a ship). In this example, a first algorithm "Big/Little" compares the image size to a threshold and only pass forward the smaller images, a second algorithm "Cloud Cover" assesses cloud cover and only passes forward the images whose cloud cover would not prevent object detection, a third algorithm "quality sun" identifies and passes forward those images taken at a desirable sun angle (e.g., around noon) with minimal shadowing, a fourth algorithm "Land/Water" separates and branches the images into land and water and a fifth algorithm for each branch is an automated target recognition algorithm for land or water the generates the object detection. The audio chain is configured to detect a voice recognition object. The audio chain may process by source, language, quality, key words and finally frequency of key words. The text chain is configured to extract text relevant to a missile object. The text chain may process based on text format, language, top, key words and frequency. The Human Intel chain is configured to detect intelligence related to a missile. The human intel chain may process based on source, language, topic, sentiment, key words and frequency. The signals chain is configured to locate an object that is the source of the signals.

Figure 8B:
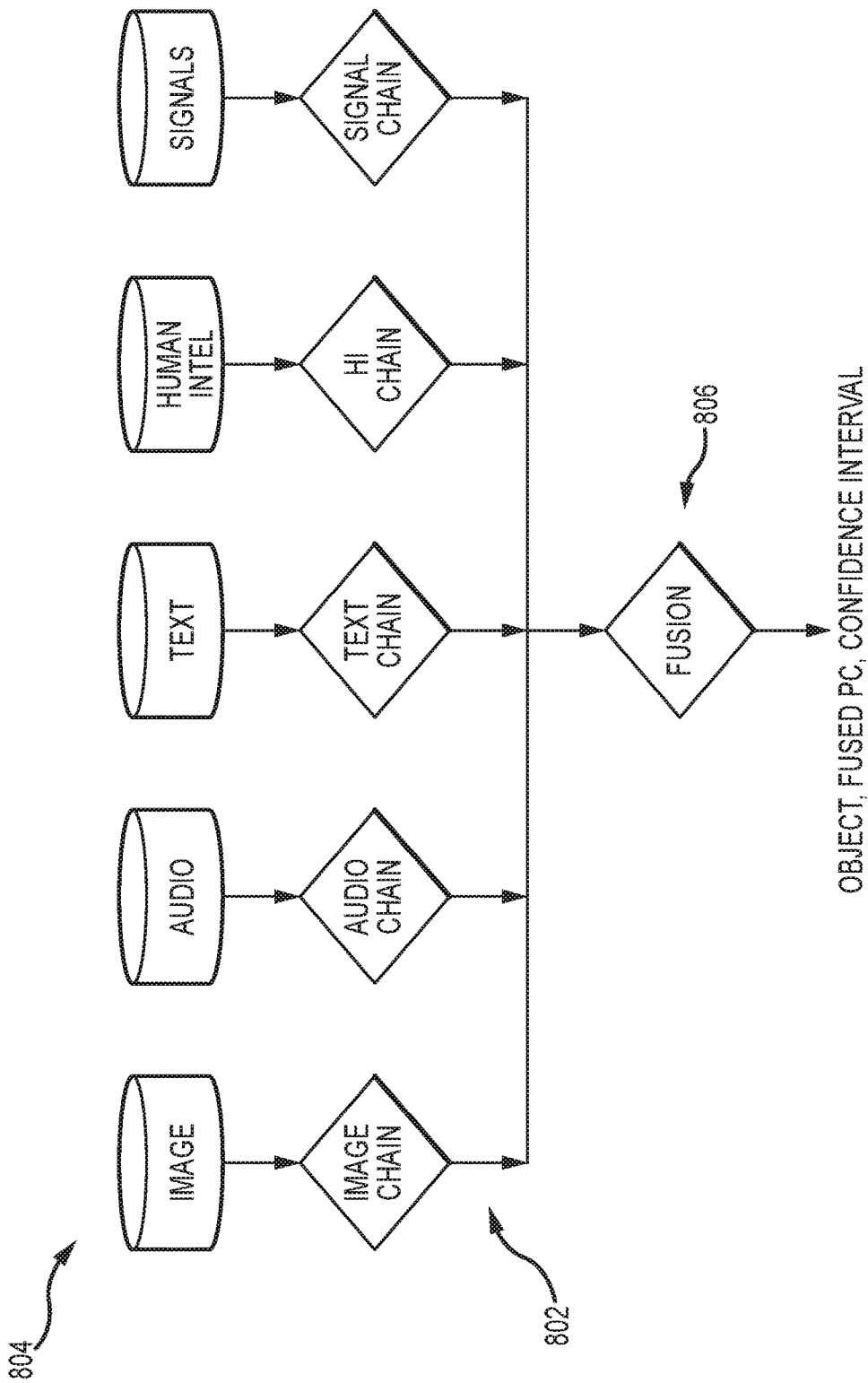

FIG. 8b is a depiction of multiple chains 802 configured to detect or support the detection of the same object for different data types. In operation, the source data 804 of a particular data type is fed through the corresponding chain 802. The results of each chain are fused 806 to provide fused Pc and confidence interval.

FIGS. 9, 10 and 11a-11b are, respectively, a process flow diagram 900 depicting an embodiment of an operational phase, a visualization 1000 (e.g. a GUI) of the processing results for the algorithmic chain and graphs 1100, 1102 illustrating the culling of source data as it passes through the chain and the processing load, and graphs 1004,1006 of both the cumulative trained Pc and the actual cumulative algorithmic Pc at each level of the chain.

Figure 9:
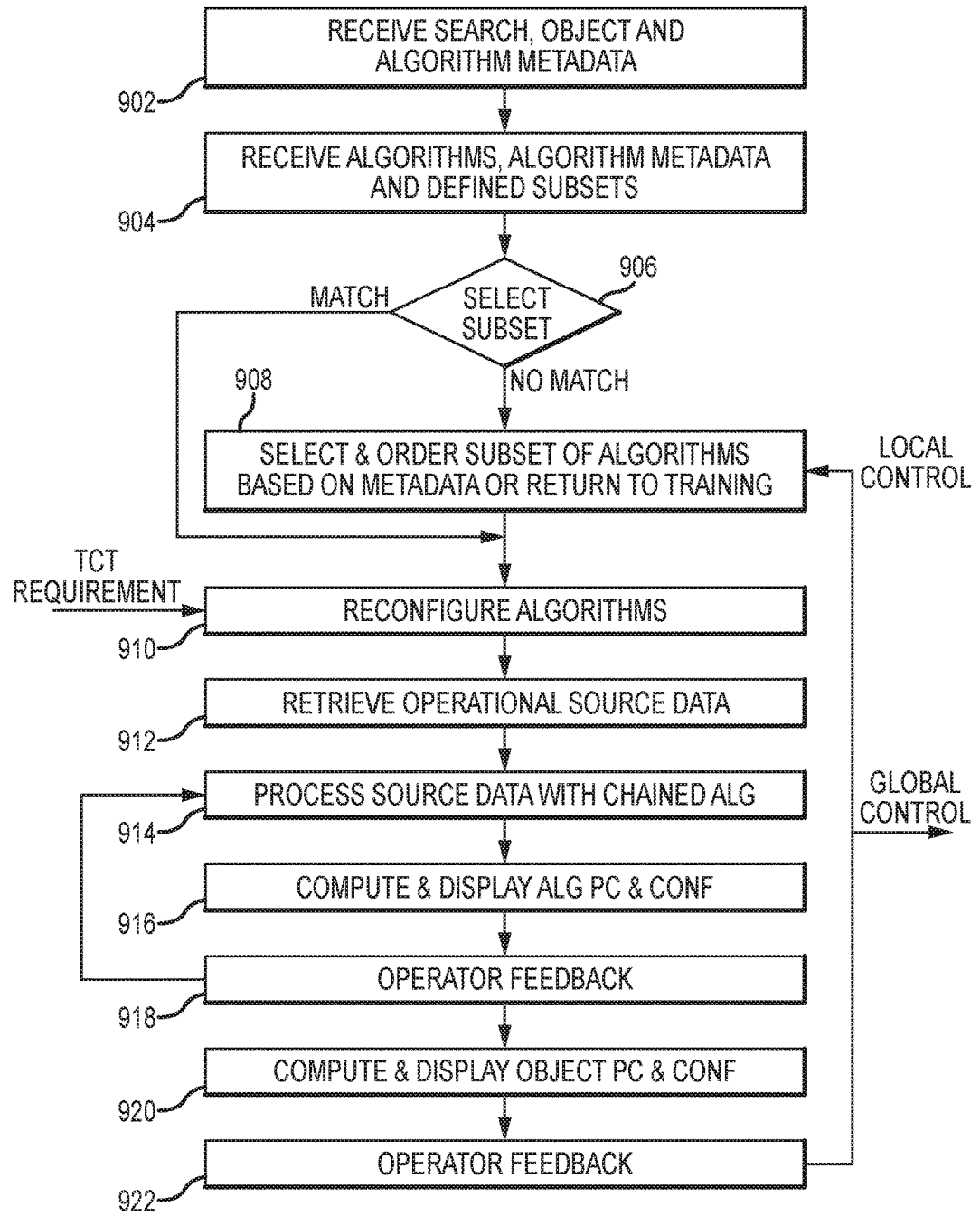
FIG. 9 illustrates a method, according to an example embodiment, for real-time selection of a defined chained subset and processing of source data to detect an object.
Figure 10:
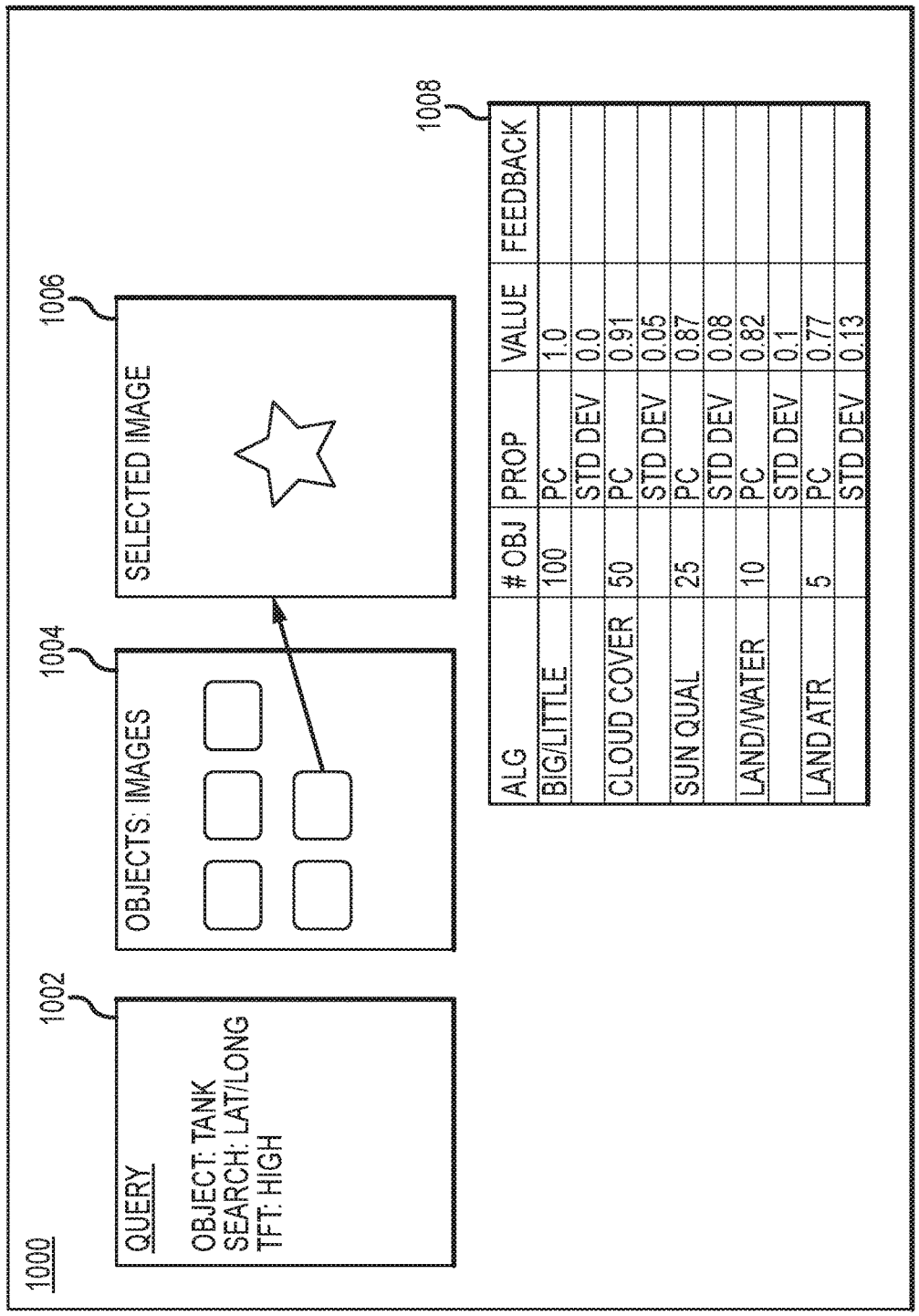
FIG. 10 is a diagram of a graphic user interface (GUI), according to an example embodiment, supporting a query, displayed results and operator feedback.

Referring now to FIGS. 9 and 10, the client device may be used as the user interface to the client-server architecture in which case the client device is used to define the search query and to display the results, the client-server being used to execute the algorithms and implement the stochastic processing. Alternately, the client device may retrieve the images and execute all of the processing locally.

The operational process is initiated by receiving, by the one or more hardware processors (in the server or client device, object metadata including a plurality of characteristics that define the object to be detected and search metadata including a plurality of context parameters that define a search for the object (step 902). An operator may provide this metadata by defining a search query 1002 for a particular object via a GUI. The one or more hardware processors also receive a plurality algorithms, algorithm metadata including a plurality of algorithm characteristics that describe each algorithm, and a plurality of defined subsets of chained algorithms configured to detect different objects (step 904).

One of the subsets is selected based on the object metadata from the plurality of defined subsets (step 906). If none of the defined subsets match the object, then a new subset of chained algorithms is configured to define a selected subset (step 908). The client device may define a new subset based on search, object and algorithm metadata or request a new subset from the client-server. Optionally, a mission TCT requirement may be received as an input. This requirement may be used to reconfigure one or more of the algorithms in the chain (step 910). For example, if a minimum time to object detection is critical and the processing resources of a client device are limited, the algorithms may be reconfigured to more aggressively cull the operation data set. This may be achieved, for example, by raising a decision threshold in one or more of the algorithms to pass fewer source data forward. Alternately, the mission TCT requirement may be used to select different instantiations of a subset with different target culling percentages.

Once the algorithmic chain has been selected and any reconfiguration done, a plurality of source data of the given data type (matching the algorithmic chain) are retrieved based on the plurality of context parameters (step 912). The retrieved source data is processed in order according to the chain of the selected subset of algorithms to obtain a plurality of results and to reduce the number of source data that is processed by the next algorithm in the chain (step 914). At each stage, a "button" 915 is displayed on the GUI for each of the source data passed through the current level. The operator can select a button 1004 to display a corresponding image, graph, plot, word cloud etc. 1006. As the source data is processed through each level in the chain, a cumulative algorithm Pc and confidence interval representing whether the result of that level is correct is computed and displayed 1008 with the name of the algorithm and the number of objects passed forward (step 916). The cumulative algorithm Pc and confidence interval are calculated using the DES to implement the SMM and perform a Monte Carlo analysis similar to that performed during training.

The operator is prompted to provide feedback as to whether the result was or was not in fact correct (step 918). This may be done via a "button" or other input on the GUI. For example, if an algorithm is configured to pass images of land and passes 8 images of land and 2 images of water, the operator can confirm the 8 images and disqualify the 2 images. This feedback can be used for either or both of "local" or "global" control. Local control may decide that the current algorithmic chain is not performing adequately on the source data and decide to create a new subset of chained algorithms or it may exclude certain types of source data. Global control can use the feedback for continual training to refine conditional probabilities and adjust the makeup of subsets.

Upon completion of the algorithmic chain, an object Pc and its confidence level is computed (step 920) representing whether the object was detected in one or more of the retrieved source data output from the last algorithm based on the at least one result. If the last algorithm in the chain is the object detection algorithm, then the object Pc is just the last algorithm Pc. However, if object detection is based on the cumulative evidence of all of the results, then the object Pc and its confidence interval is a separate calculation. The operator may provide feedback as to whether final object detection was or was not in fact correct (step 922).

Figure 11A:
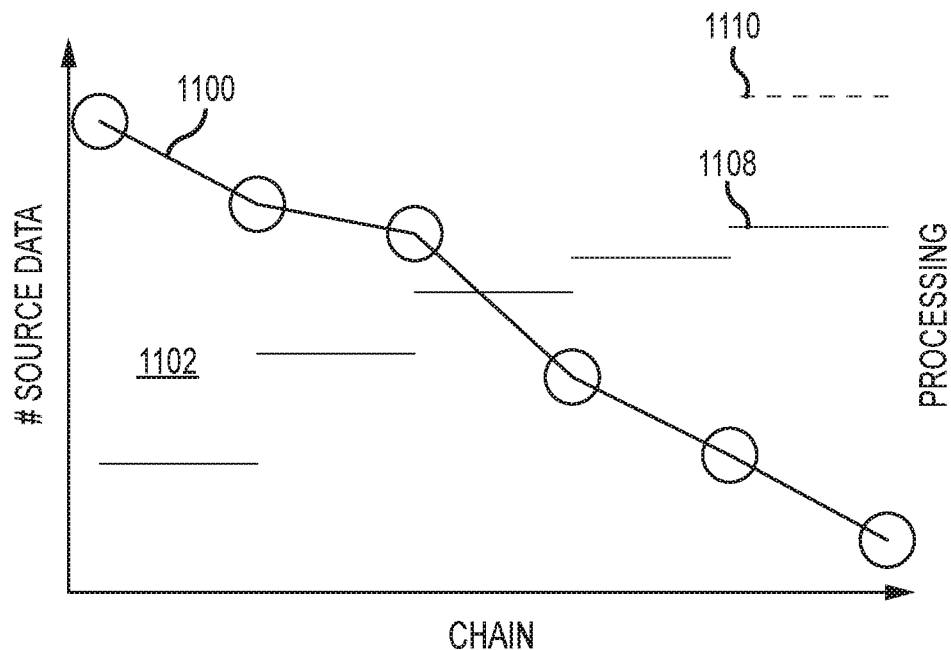
FIGS. 11a and 11b illustrate graphs demonstrating the reduction of processed source data and reduced processing load and the algorithm Pc and confidence level of each chained algorithm and the subset in total obtained by the global object recognition server.

Referring now to FIG. 11a, graph 1100 plots the number of source data as the source data passes through and is culled by the algorithmic chain. The amount of source data that is processed by and output from the last algorithm in the chain is greatly reduced. The actual culling percentage will likely deviate somewhat from the nominal culling percentage due to differences in and the sample size of the operational source data. Because the algorithmic chain is suitably back-end loaded with the algorithms (such as the object detection algorithm) that require more processing resources, as shown in graph 1102 the total processing load 1108 is far less than the processing load 1110 using just the object detection algorithm to process all of the source data. Furthermore, in resource limited devices such as a typical client device, the run time, hence time to object detection, may actually be less using the chained algorithms than a single object detection algorithm.

Figure 11B:
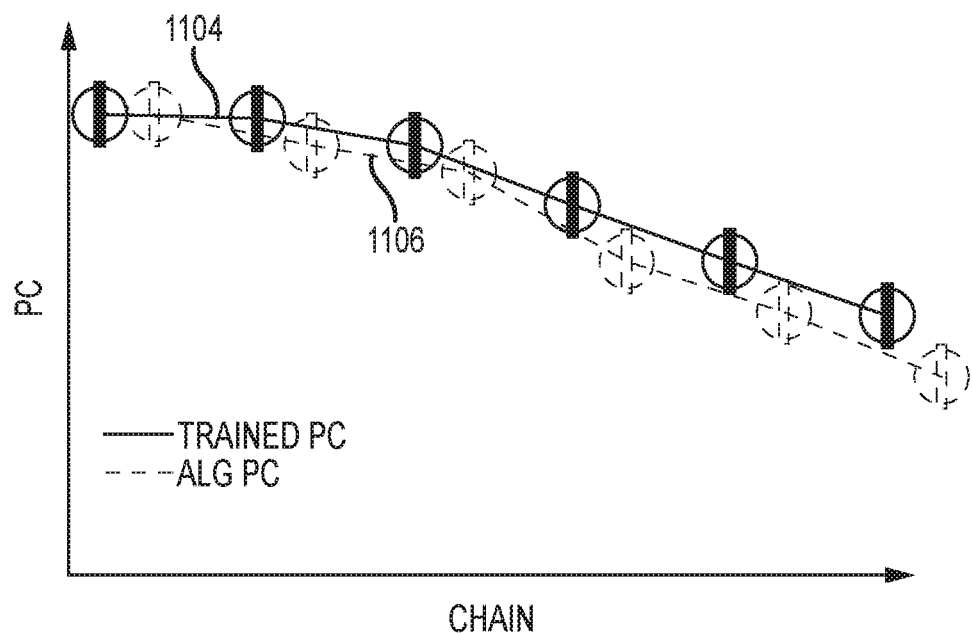

Referring now to FIG. 11b, graph 1104 plots the cumulate trained Pc for the algorithmic chain of a particular subset and graph 1106 plots the cumulative algorithm Pc as applied to a set of operational source data that is fed through the algorithmic chain. In theory, if the set of operational source data is representative of the much larger set of training source data, the Pc values should be very close.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-10 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 12:
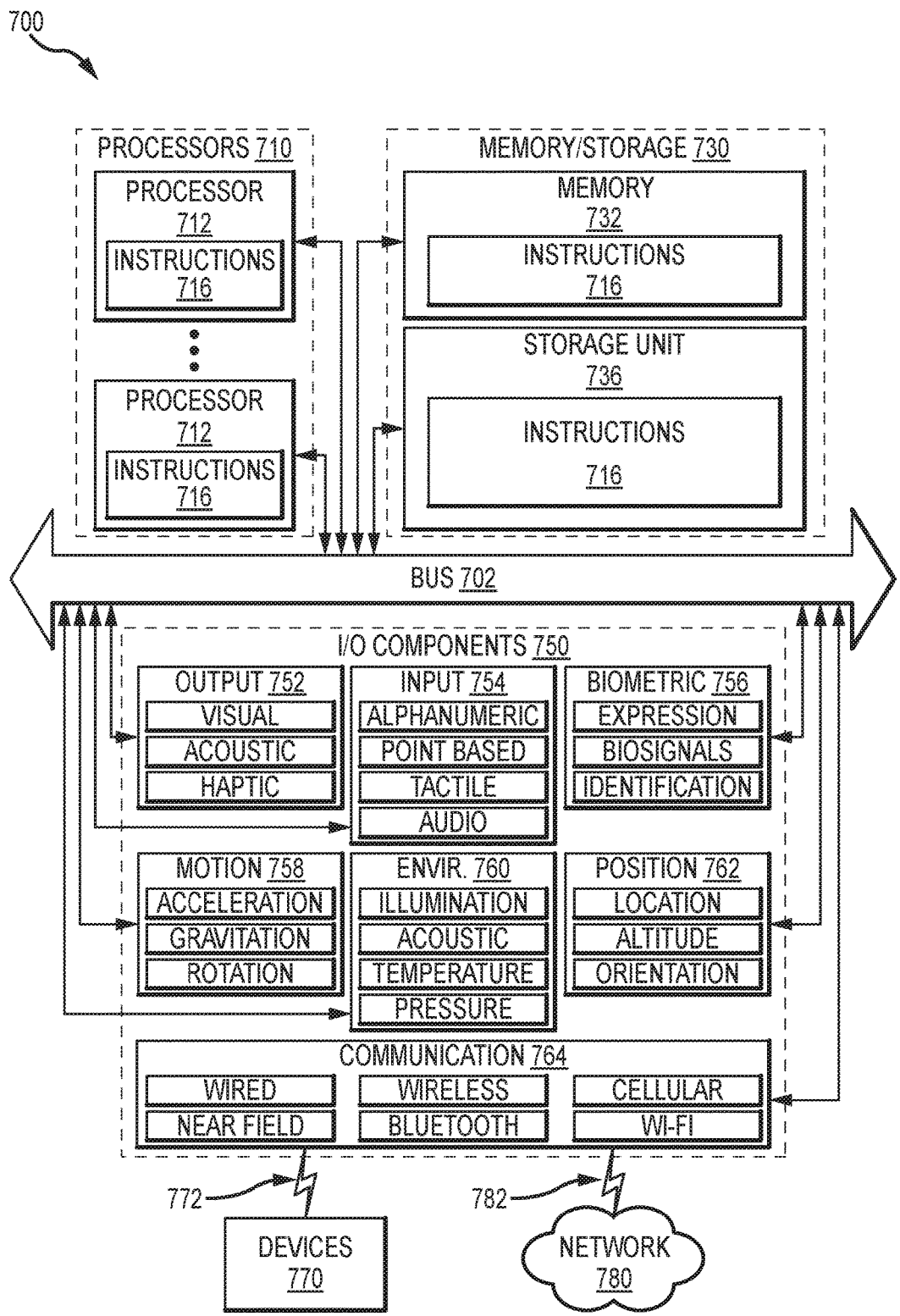
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 700, according to some example embodiments, able to read instructions from a machine-readable medium (e.g., a machine-readable storage medium) and perform any one or more of the methodologies discussed herein. Specifically, FIG. 12 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions may cause the machine to execute the flow diagrams of FIGS. 4, 5 and 9. Additionally, or alternatively, the instructions may implement one or more of the components of FIGS. 1-2. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 12 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Electrically Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 12. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implemented method for global object recognition comprising:
    receiving, by the one or more hardware processors, object metadata including a plurality of characteristics that define an object to be detected;
    receiving, by one or more hardware processors, search metadata including a plurality of context parameters that define a search for the object;
    retrieving, based on the object and search metadata, a plurality of source data of a given data type;
    selecting, from a plurality of algorithms, a subset of algorithms to be used in processing the retrieved source data based on a cumulative trained probability of correctness (Pc) that each of the algorithms, which are processed in a chain and conditioned upon the result of the preceding algorithms, produce a correct result;
    ordering the algorithms in the subset based on algorithm metadata including a plurality of algorithm characteristics to reduce an expected processing load of the retrieved source data; and
    processing the retrieved source data in order according to the chain of the selected subset of algorithms to obtain a plurality of results and to reduce the number of source data that is processed by the next algorithm in the chain, at least one result indicating whether the object was detected in corresponding source data output from the last algorithm in the chain.

2. The method of claim 1, further comprising:
    computing a cumulative object Pc and confidence interval representing whether the object was detected in the plurality of source data.

3. The method of claim 2, further comprising:
    computing a cumulative algorithm Pc and confidence interval representing whether the result of each algorithm in the chain was correct in the plurality of source data.

4. The method of claim 1, further comprising configuring the algorithms in the subset to reduce the number of retrieved source data by a nominal culling percentage.

5. The method of claim 4, further comprising:
    receiving, by one or more hardware processors, a mission time critical targeting (TCT) requirement; and
    reconfiguring one or more of the image processing algorithms to adjust the nominal culling percentage based on the mission TCT requirement.

6. The method of claim 1, wherein the steps of selecting and ordering the subset of algorithms further comprises:
    for a plurality of objects, non-real-time evaluation of a plurality of candidate subsets of different chained algorithms configured based on object and algorithm metadata, selection of a subset based on its cumulative trained Pc and expected processing load for each said object and storing of selected subsets in a repository; and
    real-time selection of the subset from the repository based on the object metadata.

7. The method of claim 6, wherein a candidate subset's cumulative trained Pc is evaluated against a threshold after each image processing algorithm in the chain and disqualified if the trained Pc does not exceed the threshold.

8. The method of claim 7, wherein the plurality of candidate subsets' cumulate trained Pc are evaluated against a different threshold at each level of a multi-path tree to disqualify algorithms within the subset chain at that level and to identify one or more candidate algorithms to replace the disqualified algorithm at that level to continue the chain, complete the subset, and ensure that at least one subset's cumulative Pc exceeds a final threshold.

9. The method of claim 6, further comprising using a stochastic math model (SMM) to compute the cumulative trained Pc and using a discrete event simulator (DES) to implement the SMM and perform a Monte Carlo simulation on multiple instances of the object in the source data to generate the confidence interval corresponding to the Pc at each level.

10. The method of claim 6, wherein the expected processing load is based on both the processing resources required to run each algorithm and a nominal culling percentage for that algorithm.

11. The method of claim 6, further comprising:
    selecting multiple subsets each configured to detect the object, each said subset's algorithms configured to process a different data type of source data;

retrieving multiple source data for each data type;

processing the source data according to the selected subset for the data type to obtain one or more results for each subset indicating whether the object was detected; and fusing the one or more results for each subset to obtain one or more results indicating whether the object was detected.

12. The method of claim 11, further comprising:

computing and displaying a cumulative fused Pc and confidence interval for the detected object.

13. The method of claim 6, wherein the algorithms in the candidate subsets are configured to reduce the number of retrieved source data by a nominal culling percentage in total.

14. The method of claim 13, further comprising:

receiving a mission time critical targeting (TCT) requirement; and reconfiguring one or more of the algorithms to adjust the nominal culling percentage based on the mission TCT requirement.

15. The method of claim 6, further comprising:

computing and displaying a cumulative object Pc and confidence interval for the detected object.

16. The method of claim 15, further comprising:

for each algorithm in the chain, computing and displaying a cumulative algorithm Pc and confidence interval.

17. The method of claim 6, further comprising:

if the object metadata is not a match for a subset, selecting in real-time a subset of algorithms based on the object and algorithm metadata and ordering the algorithms to reduce an expected processing load.

18. The method of claim 6, further comprising:

receiving operator feedback as to whether the detected object was correct or incorrect.

19. The method of claim 6, further comprising:

receiving operator feedback as to whether the result for each said algorithm was correct or incorrect.

20. The method of claim 6, further comprising using a non-real-time evaluation global object recognition server and cluster of processing nodes to perform the non-real-time evaluation and using a client device to perform the real-time processing.

21. The method of claim 1, wherein processing the retrieved source data in order according to the chain comprises:

for each of the first N−1 algorithms in the chain, determining at least one probability and an associated confidence value representing whether the object was located in one or more of the retrieved one or more source data and whether data representing the object is correctly passed to the next algorithm in the chain based on the at least one result; and for the Nth algorithm in the chain, determining a probability and associated confidence value for a geographic location of the object in the one or more remaining source data.

22. The method of claim 21, further comprising:

generating a visualization in the form of a heatmap of the at least one probability and the associated confidence value mapped to the geographic location corresponding to the at least one source data.

23. The method of claim 1, wherein the chain is an image chain configured to detect a land or water object, said image chain including a plurality of image size, cloud cover, sun quality, land/water, land object detection and water objection detection algorithms.

24. The method of claim 1, wherein the chain is an audio chain configured to detect a voice recognition object, said audio data chain including a plurality of source, language, quality, key words and frequency of key words algorithms.

25. The method of claim 1, wherein the chain is a text chain configured to extract text relevant to an object, said text data chain including a plurality of text format, language, topic, key words and frequency of key words algorithms.

26. The method of claim 1, wherein a signals chain is configured to locate an object that is the source of signals, said signals chain including a plurality of signal type, waveform, positioning and location algorithms.

27. A computer-implemented method for global object recognition comprising:

(a) receiving, by the one or more hardware processors, object metadata including a plurality of characteristics that define an object to be located;

(b) receiving, by one or more hardware processors, for each of a plurality of algorithms configured to process source data of a given data type selected from one of image, audio, text and signals, algorithm metadata including a plurality of algorithm characteristics that describe the algorithm;

(c) retrieving a plurality of training source data of the given data type;

(d) selecting, from the plurality of algorithms, based on the object and algorithm metadata a plurality of candidate subsets of algorithms to be used in processing the retrieved source data;

(e) for each candidate subset, ordering the algorithms in a chain based on algorithm metadata to reduce an expected processing load, wherein an image chain is configured to detect a land or water object, said image chain including a plurality of image size, cloud cover, sun quality, land/water, land object detection and water objection detection algorithms, wherein an audio chain is configured to detect a voice recognition object, said audio chain including a plurality of source, language, quality, key words and frequency of key words algorithms, wherein a text chain is configured to extract text relevant to an object, said text chain including a plurality of text format, language, topic, key words and frequency of key words algorithms and wherein a signals chain is configured to locate an object that is the source of signals, said signals chain including a plurality of signal type, waveform, positioning and location algorithms;

(f) for each candidate subset, processing the retrieved source data in order according to the chain of algorithms to obtain a plurality of results and to reduce the number of training source data that is processed by the next algorithm in the chain, at least one result indicating whether the object was identified in corresponding source data output from the last algorithm in the chain;

(g) for each candidate subset, computing a cumulative trained probability of correctness (Pc) and corresponding confidence interval that each of the algorithms, which are processed in the chain and conditioned upon the result of the preceding algorithms, produce a correct result;

(h) selecting a candidate subset based on its trained Pc and corresponding confidence interval and expected processing load;

(i) pairing the selected subset of algorithms with the object to be detected; and (j) repeating the steps (a) through (i) for either the same object with a different data type or for different objects.

28. The method of claim 27, further comprising
selecting, from a plurality of algorithms for a different data type, a subset of algorithms to be used in processing the retrieved source data based on a cumulative trained probability of correctness (Pc) that each of the algorithms, which are processed in a different chain, ordering the algorithms to reduce the expected processing load and processing the retrieved source data of the different data type; and
fusing the results of the different chains to provide a fused result indicating whether the object was detected.

29. A computer-implemented method for global object recognition comprising:
receiving, by the one or more hardware processors, object metadata including a plurality of characteristics that define the object to be detected;
receiving, by one or more hardware processors, search metadata including a plurality of context parameters that define a search for the object;
receiving, by one or more hardware processors, a plurality algorithms, algorithm metadata including a plurality of algorithm characteristics that describe each algorithm, and a plurality of defined subsets of chained algorithms configured to detect different objects, each said defined subset selected based on a cumulative trained probability of correctness (Pc) and corresponding confidence interval that each one of the algorithms, which are processed in the chain and conditioned upon the result of the preceding algorithms, produce a correct result and an expected processing load of the chain;
selecting, from the plurality of defined subsets, based on the object metadata one of the defined subsets, said algorithms in the selected subsets configured to process source data of a given data type selected from one of image, audio, text and signals;
if none of the defined subsets match the object to be located, based on the object and algorithm metadata selecting and ordering in a chain a plurality of algorithms, configured to process source data of a given data type, to define a selected subset, wherein an image chain is configured to detect a land or water object, said image chain including a plurality of image size, cloud cover, sun quality, land/water, land object detection and water objection detection algorithms, wherein an audio chain is configured to detect a voice recognition object, said audio chain including a plurality of source, language, quality, key words and frequency of key words algorithms, wherein a text chain is configured to extract text relevant to an object, said text chain including a plurality of text format, language, topic, key words and frequency of key words algorithms and wherein a signals chain is configured to locate an object that is the source of signals, said signals chain including a plurality of signal type, waveform, positioning and location algorithms;
retrieving, based on the plurality of context parameters, a plurality of source data of the given data type;
processing the retrieved one or more source data in order according to the chain of the selected subset of algorithms to obtain a plurality of results and to reduce the number of source data that is processed by the next algorithm in the chain, at least one result indicating whether the object was detected in corresponding source data output from the last algorithm in the chain; and
determining a cumulative object Pc and confidence interval representing whether the object was detected in one or more of the retrieved source data output from the last algorithm based on the at least one result.

30. A computer-implemented method for global object recognition comprising:
receiving, by the one or more hardware processors, object metadata including a plurality of characteristics that define an object to be detected;
receiving, by one or more hardware processors, search metadata including a plurality of context parameters that define a search for the object;
retrieving, based on the object and search metadata, a plurality of source data of a given data type selected from one of image, audio, text and signals;
selecting, from a plurality of algorithms, a subset of algorithms to be used in processing the retrieved source data based on a cumulative trained probability of correctness (Pc) that each of the algorithms, which are processed in a chain and conditioned upon the result of the preceding algorithms, produce a correct result, wherein an image chain is configured to detect either land or water objects, said image chain including a plurality of image size, cloud cover, sun quality, land/water, land object detection and water objection detection algorithms, wherein an audio chain is configured to detect a voice recognition object, said audio chain including a plurality of source, language, quality, key words and frequency of key words algorithms, wherein a text chain is configured to extract text relevant to an object, said text chain including a plurality of text format, language, topic, key words and frequency of key words algorithms, and for a signals chain is configured to locate an object that is the source of signals, said signals chain including a plurality of signal type, waveform, positioning and location algorithms;
ordering the algorithms in the subset based on algorithm metadata including a plurality of algorithm characteristics to reduce an expected processing load of the retrieved source data; and
processing the retrieved source data in order according to the chain of the selected subset of algorithms to obtain a plurality of results and to reduce the number of source data that is processed by the next algorithm in the chain, at least one result indicating whether the object was detected in corresponding source data output from the last algorithm in the chain.

* * * * *